US008950377B2

(12) United States Patent
Drachko

(10) Patent No.: US 8,950,377 B2
(45) Date of Patent: Feb. 10, 2015

(54) HYBRID INTERNAL COMBUSTION ENGINE (VARIANTS THEREOF)

(76) Inventor: Yevgeniy Fedorovich Drachko, Kiev (UA)

( * ) Notice: Subject to any disclaimer, the term of this patent is extended or adjusted under 35 U.S.C. 154(b) by 0 days.

(21) Appl. No.: 14/119,861

(22) PCT Filed: May 31, 2012

(86) PCT No.: PCT/UA2012/000056
§ 371 (c)(1),
(2), (4) Date: Nov. 23, 2013

(87) PCT Pub. No.: WO2012/166079
PCT Pub. Date: Dec. 6, 2012

(65) Prior Publication Data
US 2014/0109864 A1 Apr. 24, 2014

(30) Foreign Application Priority Data
Jun. 3, 2011 (UA) .................... 201106981

(51) Int. Cl.
*F02B 53/00* (2006.01)
*F01B 13/04* (2006.01)
*F03C 2/00* (2006.01)
(Continued)

(52) U.S. Cl.
CPC .................. *F02B 57/00* (2013.01); *F01C 1/077* (2013.01); *F02B 53/04* (2013.01); *F02B 53/08* (2013.01); *F01C 21/106* (2013.01); *Y02T 10/17* (2013.01); *F01C 11/002* (2013.01); *F01C 21/04* (2013.01)
USPC ........... 123/245; 123/241; 123/242; 123/243; 123/43 B; 418/34; 418/35; 418/37

(58) Field of Classification Search
CPC ............ F01C 1/077; F01C 1/07; F02B 57/00; F02B 53/04; F02B 53/08; Y02T 10/17
USPC ....... 123/200, 223, 241, 242, 245, 246, 43 B; 60/605.3, 39.6, 39.62, 39.63; 418/33–38
See application file for complete search history.

(56) References Cited

U.S. PATENT DOCUMENTS 1,729,242 A * 9/1929 Bregere ..................... 418/33
1,944,875 A * 1/1934 Bullington ................ 277/357
(Continued)

FOREIGN PATENT DOCUMENTS

WO WO 2011/010978 A1 1/2011

OTHER PUBLICATIONS

International Search Report, Sep. 25, 2012, from International Phase of the instant application.
(Continued)

*Primary Examiner* — Kenneth Bomberg
*Assistant Examiner* — Jason T Newton
(74) *Attorney, Agent, or Firm* — Jackson Patent Law Office

(57) ABSTRACT

A hybrid internal combustion engine (variants thereof) comprises a casing having an annular working chamber with intake, exhaust ports, and overflow channels; and two drive shafts coaxial with the working chamber; a stationary central gear wheel; an output shaft having an offset portion fixedly carrying a carrier and a planetary gear; connecting rods pivotally connecting the carrier and the arms of both drive shafts, wherein the overflow channels are adjacent to the working chamber and connect the compression and expansion sections thereof.

1 Claim, 18 Drawing Sheets

(51) Int. Cl.
*F02B 57/00* (2006.01)
*F01C 1/077* (2006.01)
*F02B 53/04* (2006.01)
*F02B 53/08* (2006.01)
*F01C 21/10* (2006.01)
*F01C 11/00* (2006.01)
*F01C 21/04* (2006.01)

(56) References Cited

U.S. PATENT DOCUMENTS

| | | | | |
|---|---|---|---|---|
| 2,349,848 | A | * | 5/1944 | Davids ............... 418/36 |
| 3,807,368 | A | * | 4/1974 | Johnson ............. 123/245 |
| 4,311,442 | A | * | 1/1982 | Simon ............... 418/37 |
| 4,419,057 | A | * | 12/1983 | Menioux ............. 418/36 |
| 4,568,273 | A | * | 2/1986 | Narumiya ............ 432/31 |
| 4,699,839 | A | * | 10/1987 | Hornberger ........ 428/312.8 |
| 4,867,634 | A | * | 9/1989 | Baker et al. ....... 415/121.2 |
| 5,112,204 | A | | 5/1992 | Parsons |
| 6,886,527 | B2 | * | 5/2005 | Regev ............... 123/245 |
| 7,472,676 | B2 | * | 1/2009 | McCoin et al. ....... 123/241 |
| 7,909,590 | B2 | * | 3/2011 | Pomar ............... 418/37 |
| 8,037,861 | B2 | * | 10/2011 | Liang ............... 123/241 |
| 8,210,151 | B2 | * | 7/2012 | Drachko ............. 123/245 |
| 2003/0200951 | A1 | * | 10/2003 | Morgado ............ 123/245 |
| 2005/0016493 | A1 | * | 1/2005 | Hoose ............... 123/245 |
| 2005/0188943 | A1 | * | 9/2005 | Gonzalez et al. ..... 123/245 |
| 2005/0217636 | A1 | * | 10/2005 | Turner .............. 123/245 |
| 2006/0027207 | A1 | * | 2/2006 | Hangan .............. 123/245 |
| 2007/0199537 | A1 | * | 8/2007 | Morgado ............ 123/245 |
| 2010/0132659 | A1 | * | 6/2010 | Ambardekar .......... 123/245 |
| 2010/0180858 | A1 | * | 7/2010 | Omori ............... 123/245 |
| 2010/0251991 | A1 | * | 10/2010 | Drachko ............. 123/221 |

OTHER PUBLICATIONS

English Translation of the Written Opinion of the International Search Authority, Dec. 3, 2013, from International Phase of the instant application.

English Translation of International Preliminary Report on Patentability Chapter I, Dec. 4, 2013, from International Phase of the instant application.

* cited by examiner

HYBRID INTERNAL COMBUSTION ENGINE (VARIANTS THEREOF)

TECHNICAL FIELD

The claimed hybrid internal combustion engine (hereinafter HICE) can be used as a technical device for converting fuel energy into mechanical work.

The present invention relates to the structure of rotary-piston machines (hereinafter RPM) comprising a working chamber with positive displacement members of the RPM, such as rotary pistons, plungers, cups that are disposed in one casing (stage). Their cooperative motion is implemented by a planetary train. The train provides for a mutually related and rotationally oscillatory motion of the positive displacement members of the RPM.

The RPM equipped with such positive displacement members depending on any auxiliary equipment can operate as rotary-piston internal combustion engines (hereinafter RPICE) on any liquid and/or gaseous fuel with internal and/or external carburetion.

A feature of the claimed HICE is that there is no need to interrupt fuel combustion for it to operate. For other machines of positive displacement (e.g., reciprocating internal combustion engine) a regular interruption of fuel combustion is required for their normal operation. In contrast, for normal operation of gas turbine engines there must be a continuous burning of the fuel. The HICE operation has much in common with that of heat engines of volumetric expansion, but is also characterized by the organization of ignition and combustion of the fuel. This is what makes them different from the known types of internal combustion engines and therefore they are referred here as "hybrid".

Such engines are designed for:
(a) various vehicles such as motorcars, cabs and trucks; small-size water crafts such as motorboats, small ships, and yachts;
superlight and light aircraft such as paramotors, powered hang gliders, airplanes, and particularly light-weight helicopters;
(b) motor systems for recreational activities and leisure sports, such as motorcycles, four wheeled bikes, scooters, and snowmobiles;
(c) tractors, harvesting combines and other self-propelled farm implements, and
(d) compact and mobile electric generators."

As used herein:
the term "rotary-piston machine or RPM" means a machine comprising a working chamber with positive displacement members of the rotary-piston machines, such as rotary pistons, plungers, cups that are disposed in one casing (stage);
the term "rotary-piston internal combustion engine or RPICE" means an engine having at least two pairs of rotary pistons mounted on coaxial shafts disposed in at least one annular casing (section). There can be several such casings (sections) and they can be arranged adjacent to each other;
the term "rotary pistons" means such positive displacement structural members, between which and the internal walls of one stage alternations of working fluid volumes occur;
the term "end face" means a peripheral surface of each rotary piston mating to the internal walls of the casing;
the term "side" means a side surface of each rotary piston mating on its perimeter to the internal walls of the casing;
the term "closing of sides" means a position of the sides of adjacent rotary pistons characterized by a minimum chamber/distance between them;
the term "working chamber" means a chamber confined between the internal wall of the casing and the rotary piston faces. It has at least four instant subchambers, simultaneously existing and varying in volume. In operation, the chamber of the rotary-piston machines has a constant volume independent of the angular displacement of the rotary pistons.
the term "instant subchamber" means each variable portion of the chamber, confined between the faces of neighboring rotary pistons and the internal walls of one stage and where the operating cycles take place one after another.
the term "overflow content" means a total capacity of exit and entrance (from/to the annular chamber of the casing) channels as well as chambers connectable thereto, connecting pipes included;
the term "overflow channel" means a cumulative passage extending beyond the annular working chambers of the casing and connecting compression and expansion portions of the working chambers of the casing;
the term "activator" means an apparatus for increasing the quantum-energy potential of fuel particles or air-fuel mixture particles, the apparatus comprising an external energy source, a transmitting channel, and an emitter;
the term "additional working fluid" means water, steam, or other water-containing substances.

BACKGROUND ART

Known in the art are rotary vane machines with planetary trains designed for the above-mentioned applications, e.g., by E. Kauertz, U.S. Pat. No. 3,144,007 for Rotary Radial-Piston Machine, issued 1967 (appl. Aug. 11, 1964); U.S. Pat. No. 6,886,527 ICT for Rotary Vane Motor.

Such machines are also disclosed in German Patent No. 142119 issued 1903; German Patent No. 271552 issued 1914, cl. 46 a6 5/10; French Patent No. 844 351 issued 1938, cl. 46 a5; U.S. Pat. No. 3,244,156 issued 1966, cl. 12-8.47; U.S. Pat. No. 6,739,307 issued May 25, 2004, cl. 123/245, for Internal Combustion Engine and Method to Ralph Gordon Morgado et al. Mechanisms and machines for similar applications are disclosed in Russian Patent No. 2 013 597, Int. cl.$^5$ F02B 53/00; Russian Patent No. 2 003 818, Int. cl.$^5$F02B 53/00; Russian Patent No. 2 141 043, Int. cl.$^6$ F02B 53/00, F04C 15/04, 29/10, issued 1998; Ukrainian Patent No. 18 546, Int. cl. F02B 53/00, F02G 1/045, issued 1997; Ukrainian Patent No. 93 603, Int. cl. F01C 1/063 (2006/01), F02B 53/10 (2006/01), F04C 2/063 (2006/01).

Planetary trains used in the prior-art machines provide for mutual and relative rotationally-oscillatory movement of their compression members such as rotary pistons. However, these known planetary trains are not able for a required service time of several thousand hours to transmit a major effort of the rotary pistons to the output shaft, e.g., several tons during the power stroke in the case of a RPICE.

The prior-art rotary-piston machines with such planetary trains have the following common structural features:
a casing having an annular chamber and an intake port and exhaust port;
at least two pairs of rotary pistons fixed on two drive shafts coaxial with the annular surface defining the chamber, and at least one of the drive shafts having a crank;
an output shaft coaxial with the drive shafts and having a carrier, at least one external planetary gear arranged on the carrier and externally meshed with a stationary central gear coaxial with the surface defining the chamber and with the drive shaft;

crankshaft(s) coaxial with the planetary gear;

connecting rods pivotally linking the arms of the drive shafts and crankshafts of the planetary gears.

The planetary train of such engines has a number of drawbacks. The first one is the need to make externally toothed planetary gears of large sizes to ensure their operability in transferring workload. Another drawback resides in the fact that the rotational speed of the planetary gears and crankshafts coaxial with them should be several times greater than the speed of rotation of the output shaft, which worsens working conditions and reduces the service life of the bearings. The third drawback resides in the fact that the crankshafts and the planetary gears coaxial with them are disposed on the carrier at a significant radial distance from the axis of the output shaft. For this reason, they are subjected to substantial centrifugal forces that additionally load the bearings of the planetary gears, which also reduces the life of the RPM.

Also known in the art is International Publication WO 2009/072994 of Jun. 11, 2009 (International Application No. PCT/UA2007/000080).

The closest prior art is disclosed in WO/2011/010978 published Jan. 27, 2011 claiming a machine having a planetary train.

This is a rotary-piston machine with a planetary mechanism. The required gear ratio transmission i=n/(n+1), where n=1, 2, 3, 4 and so on, is uniquely determined by the number n of the rotary pistons on each drive shaft of the RPM.

This machine, in particular, comprises a casing having an annular working chamber, an intake port and exhaust port, and an overflow channel as well as:

at least two drive shafts coaxial with the annular surface defining the working chamber and provided with rotary pistons on one end thereof and with arms on the other end thereof, at least one stationary central gear coaxial with the surface defining the working chamber and with the drive shafts, an output shaft concentric with the drive shafts and having a carrier with a planetary gear, crankshafts pivotally connected to the carrier the arms of both drive shafts, the planetary gear being in mesh with the stationary central gear on the internal teeth thereof.

The distinguishing feature of this RPM is that the annular working chamber of the casing has overflow channels extending outside the working chamber.

The disadvantage of such a kinematic mechanism of the RPM is a significant load on the bearing(s) of the carrier at high-speed performance. This is due to the fact that the direction of rotation of the output shaft with the offset portion carrying the carrier is opposite to the direction of rotation of the carrier. The result is heavy operating conditions at a high speed for the bearing of the carrier owing to the summation of angular velocities of the output shaft and the carrier. This inevitably leads to an accelerated wear of the bearing and accordingly a reduction of the uptime of the RPM and reliability of operation thereof. And moreover this negative effect must paid for by higher friction in this unit and accordingly by a waste of fuel energy.

DISCLOSURE OF THE INVENTION

This invention has for its object to improve engine efficiency by reducing fuel energy losses due to internal friction and the cooling of RPMs as well as incomplete combustion.

This objective is accomplished by providing a hybrid internal combustion engine comprising:

a casing having an annular working chamber and an intake port, exhaust port, overflow channels, and a planetary gear, said engine comprising:

at least two drive shafts coaxial with the annular surface defining the working chamber and provided with rotary pistons on one side and with arms on the other side, at least one stationary central gear wheel coaxial with the annular surface of the working chamber and the drive shafts;

an output shaft concentric with the drive shafts and having an offset portion fixedly carrying a carrier and a planetary gear;

connecting rods pivotally connecting the carrier and the arms of both drive shafts, characterized in that the planetary gear fixed on the carrier has internal teeth in mesh with the stationary central gear having external teeth with a gear ratio i=(n+1)/n (where n=2, 3, 4, 5 ... —a series of integers), where n equals the number of rotary pistons mounted on each of the drive shafts, wherein the overflow channels are adjacent to the working chamber and connect the compression and expansion sections thereof.

Unlike in the prior art, the concept of the invention is to improve engine efficiency by reducing fuel energy losses due to internal friction in the engine as well as incomplete combustion. A reduction of frictional wear of the friction pairs in the kinematic mechanism of the RPM can be achieved by reducing the difference in the angular velocities of the output shaft and the carrier without an increase in the relative velocities in the other frictional kinematic pairs. Unlike in the prior art, this is accomplished by changing the gear ratio of the planetary gearing to achieve unidirectional rotation of the carrier and the output shaft. In this case the condition of constant phase of closing the sides of the rotary pistons with respect to the intake ports, exhaust ports, and overflow channels must be ensured. This is accomplished as set forth in the characterizing clause of claim 1 by specifying a gear ratio of the planetary pair of the RPM depending on the number of the rotary pistons on the drive shafts (not obvious to a person skilled in the art). This is in general a solution of the problem involved in the art.

Consequently, such a kinematic mechanism of the RPM is of the type that makes use of "least increment in friction pairs" to ensure minimum losses of mechanical energy, low friction wear and better engine efficiency:

the coaxial drive shafts with the rotary pistons and the output shaft rotate in the same direction, i.e., with a minimum difference between the angular velocities;

the bearings of the connecting rods execute only a slow reciprocating rotary motion within a small angular sector (as opposed to rotational movement on the crankshaft of reciprocators);

the carrier is rotated on the offset portion of the output shaft in the same direction with the output shaft, i.e., they also have a minimum difference between their angular velocities.

The overflow channels in such a PRM are adjacent to the working chamber and connect compression and expansion sections thereof. In fact, the overflow channels function here as combustion chambers of an internal combustion engine.

The first additional feature of the claimed invention consists in that the outlet openings of a lubricator are disposed between the inlet channel and the overflow channel. This allows for a purposeful delivery of oil directly into the zone of frictional contact between the surface of the working chamber of the engine and compression seals of the rotary pistons. This ensures that the transition from dry to semi-dry friction, which greatly reduces energy losses due to friction and frictional wear of compression seals. Accordingly, the efficiency of the engine is improved.

The second additional feature of the claimed invention lies in that the annular working chamber of the casing is toroidal. Compression seals, including their angular coupling, are the most problematic spots in the rotary type of internal combustion engine. The toroidal shape of the working chamber and its compression seals ensures minimum number of corners and fillets in the seals, therefore minimal leakage of the working fluid therethrough. This ensures minimal compression losses in operation of the HICE and improvement in its efficiency.

The third additional feature of the claimed invention consists in that the casing has at least two-section annular working chamber with the drive shafts and rotary pistons,
  the output shaft has at least two offset portions carrying carriers and planetary gears,
  the planetary gears being meshed with the stationary central gear wheel and the carriers being pivotally connected via the connecting rods with the arms of the drive shafts,
  wherein both the sections of the working chamber of the casing and the offset portions of the output shaft are settable at an angle up to 180° relative to one another.

The overflow channels in such two-section RPM are adjacent to the working chamber and connect compression and expansion sections thereof. In fact, the overflow channels function as combustion chambers of an internal combustion engine. The non-uniform rotation of the output shaft of a single-section rotary RPM gives rise to increased mechanical stress peaks in the friction pairs of the engine. Mechanical energy losses due to friction get increased accordingly. A two-piece HICE with the same total volume of the working chamber provides for a uniform character of the output shaft rotation, less losses of mechanical energy and therefore better efficiency.

The fourth additional feature of the claimed invention consists in that the annular working chamber has two sections of different volumes, one being a compression section and the other an expansion section, wherein the compression section and the expansion section of a larger volume communicate through the overflow channel. Compression and expansion of the working fluid in the same volume, e.g., as it takes place in internal combustion engines, the exhaust gases immediately before the exhaust have a significant overpressure and thus energy. This energy is utilized in such HICE for additional expansion of the working fluid in the expansion section of the larger volume with useful work as a result. This provides for an increase in the HICE efficiency.

The fifth additional feature of the claimed invention consists in that the overflow channels are mounted on the casing via heat insulators. The overflow channels are the most heat intensive part of the HICE as they actually perform the function of the combustion chamber. The fact that they extend beyond the working chamber of the HICE and are mounted via heat insulators provides for a thermal relief for other structural members and the minimization of heat loss while cooling the engine. This improves the efficiency of HICE.

The sixth additional feature of the claimed invention consists in that the overflow channels are lined and/or filled with a highly porous gas-permeable heat-resistant ceramics. Fuel combustion efficiency depends on the fuel dispersibility and the quality of the air-fuel mixture. When fuel gets into the hot overflow channels and on the hot gas permeable ceramics, complex processes of its transformation go on beginning from evaporation, splitting into simpler hydrocarbons, mixing with air, ignition, combustion, etc. The hot gas permeable ceramics in the overflow channel contributes to a more effective combustion of the fuel and improves efficiency of the HICEs.

The seventh additional feature of the claimed invention consists in that the overflow channels have an activator. The quality of combustion is determined by the preliminary preparation of fuel for combustion to produce heat. Fuel atomization is only the simplest initial mechanistic preparation of the fuel prior to combustion. The quality of fuel preparation provides for evaporation of the fuel on a low-temperature surface. Hot gas permeable ceramics, which can be regarded as an independent activator, are even better. Activators can provide for better preparation of fuel for combustion on the quantum mechanical level, as well as during combustion of the fuel, by exposure of a fuel-air mixture to an electric field, radio and/or microwave and/or quantum optical field. The result is the combustion efficiency and improved profitability of the HICEs.

The eighth additional feature of the claimed invention consists in that the overflow channels have a fuel nozzle and/a nozzle for directing an additional working fluid. Efficiency of internal combustion engines is largely determined by the completeness of fuel combustion. An additional working fluid, such as water or steam at a high temperature is capable of reacting with the hydrocarbons of the fuel to form a synthetic gas comprising hydrogen and carbon monoxide. This gas can be oxidized with the release of additional heat. The presence of such a synthetic gas provides for improved efficiency of the HICEs.

The ninth additional feature of the claimed invention consists in that the fuel nozzle and/or a nozzle for directing an additional working fluid have a heat exchanger. High-temperature heating of the fuel and additional working fluid by means of heat exchangers provides for an increase in the quantum-energy state of the reactants and better-quality preparation of the fuel for combustion. The interaction between the hot fuel and superheated live steam on the hot heat-resistant ceramic pores in the overflow channels provides an energy-rich fuel-air mixture. The mixture provides for efficient fuel combustion and efficient operation of the HICE.

The tenth additional feature of the claimed invention consists in that the fuel nozzle and/or a nozzle for directing an additional working fluid are disposed between the intake port and the overflow channel. As a result, the location of the fuel nozzle and/or the nozzle for directing an additional working fluid in the immediate vicinity of the entrance to the overflow channel can provide for a high degree of compression in HICE (close to diesel) without the risk of detonation. Furthermore, there is provided a good mixture formation process as a result of intensive injection of the fuel-air mixture with high turbulence into the overflow channel/combustion chamber. All this taken together improves efficiency of the HICE. In this case, such a design provides for insulation of the fuel nozzle from the high-temperature gas. It is highly desirable because even minor "leakage of fuel" from the nozzle can result in nozzle gumming-up in contact with high temperature gas. This leads to an inoperable engine.

The eleventh additional feature of the claimed invention consists in that the intake port comprises a fuel nozzle and/a nozzle for directing an additional working fluid. The external formation of a mixture in conjunction with the directing of an additional working fluid provides for the best quality of the mixture compared to the internal formation by a greater period of time of the process of mixing. In this case, an additional increase in the mass of the working fluid improves the efficiency of the internal combustion engine and its economy through the expansion of gases with high pressure and to a larger volume.

The twelfth additional feature of the claimed invention consists in that the intake port comprises an activator disposed between the intake port and the fuel nozzle and/or the nozzle for directing an additional working fluid. The presence of an activator in the intake port provides for an increase in the quantum energy state of the air-fuel mixture and its high-quality preparation for efficient combustion. This ultimately improves the efficiency of the HICE.

The thirteenth additional feature of the claimed invention consists in that intake ports are connected to a turbocharger with an intercooler positioned between the intake port having the activator and the fuel nozzle and/or the nozzle for directing an additional working fluid. Feeding the additional working fluid and/or fuel to the turbocharger results in a fuel-air mixture, which gets a good initial mechanistic treatment in terms of fuel dispersion. The intercooler provides for fuel cooling and ensures a greater density of the working fluid at the inlet to the engine. This is necessary to ensure high specific power characteristics of the HICE without an increase in internal friction losses. Next, the activator performs additional quantum-energy fuel mixture preparation for combustion. All this taken together ensures the efficiency of combustion and improving the efficiency of the HICE.

The fourteenth additional feature of the claimed invention consists in that the turbocharger is provided with a dust carrier. HICEs can be used in a variety of conditions, including dusty roads and sandstorms. The penetration of abrasive particles with a fuel mixture into the working chamber of the HICE leads to malfunction of the compression seals, increased friction, poor efficiency of the engine, and even failure. The turbocharger can effectively perform the function of a centrifugal filter to remove dust particles. This function is performed by the dust carrier. The removing of dust from the air-fuel mixture provides for a reduction in friction losses of the compression seals and improved efficiency of the HICE.

The fifteenth additional feature of the claimed invention consists in that the input vanes of the turbocharger have an abrasion resistant coating. The input vanes of the turbocharger rotate with a high speed. Therefore, they may get damaged when they contact with the dust particles, even with water droplets.

Moreover, the wear fragments of the turbocharger vanes can in themselves cause problems to the HICE. An rubber-like abrasion resistant coating on the front edges of the turbocharger vanes prevents damage of the vanes and ensures the normal operation of the compression seals with minimal friction losses. This improves efficiency of the HICE.

BRIEF DESCRIPTION OF THE DRAWINGS

The invention will be further described by a minimum number of examples with reference to the accompanying drawings in which:

FIGS. 9-12 show a number of successive positions of the rotary pistons of the RPM as the latter operates as a rotary internal combustion engine;

The drawings schematically show:

FIG. 1 shows a longitudinal sectional view of the HICE with its planetary mechanism, for example, a rotary internal combustion engine as a positive expansion machine;

FIGS. 2-8 illustrate the operation of the planetary gear mechanism with the gear ratio i=5/4 for different angular positions of the pistons and the links of the kinematic chain in dependence of the current position of the offset portion on the output shaft, namely:

a carrier with the planetary gear mounted thereon.

These both are mounted on the offset portion of the output shaft. Their axis is marked with letter Q, the arms of the carrier designated by letters A and B, the arms of the coaxial drive shafts are designated by letters CO and DO.

Figure 2:
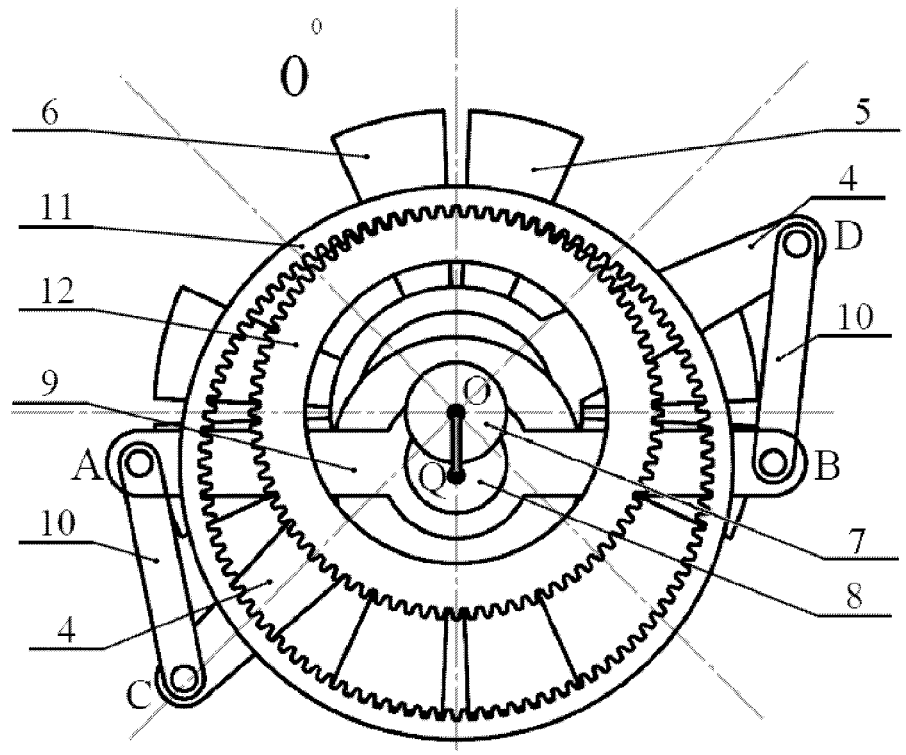
FIGS. 2-8 show a number of successive positions of the members of the kinematic mechanism to explain its work.
Figure 3:
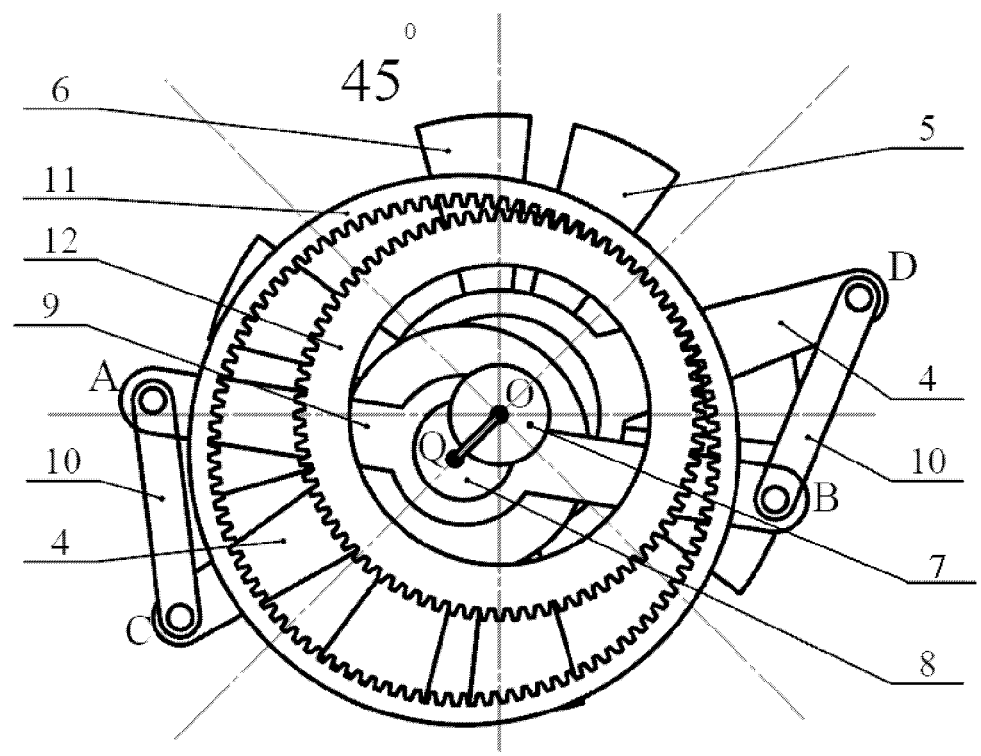
Figure 4:
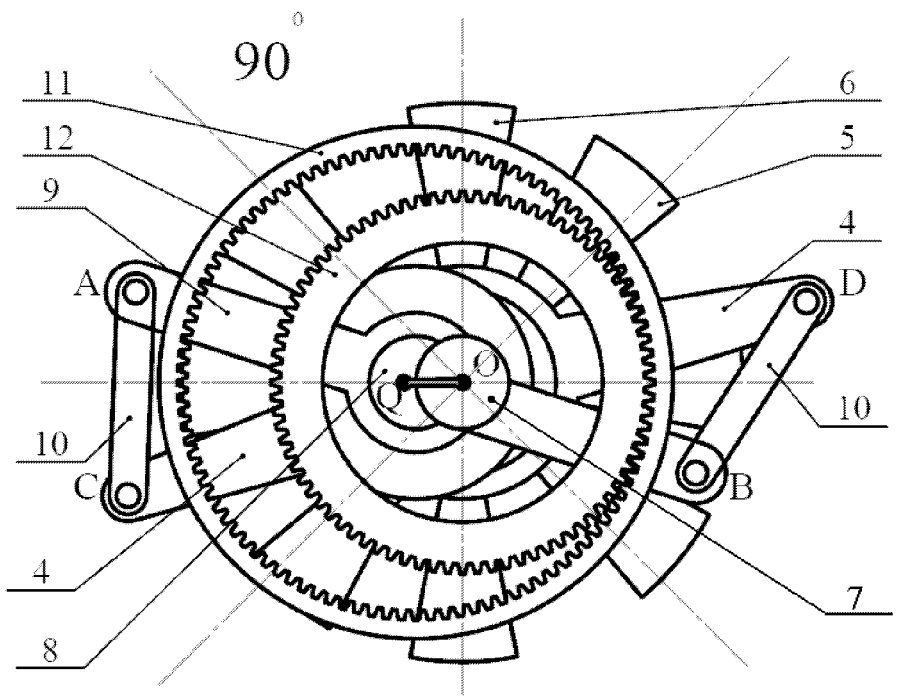
Figure 5:
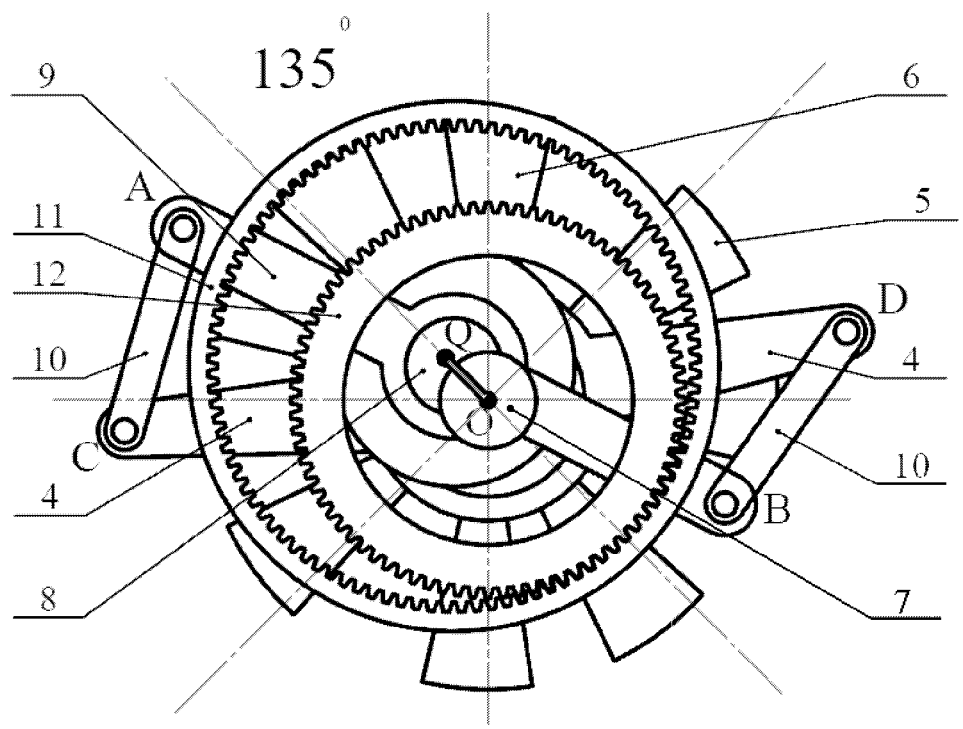
Figure 6:
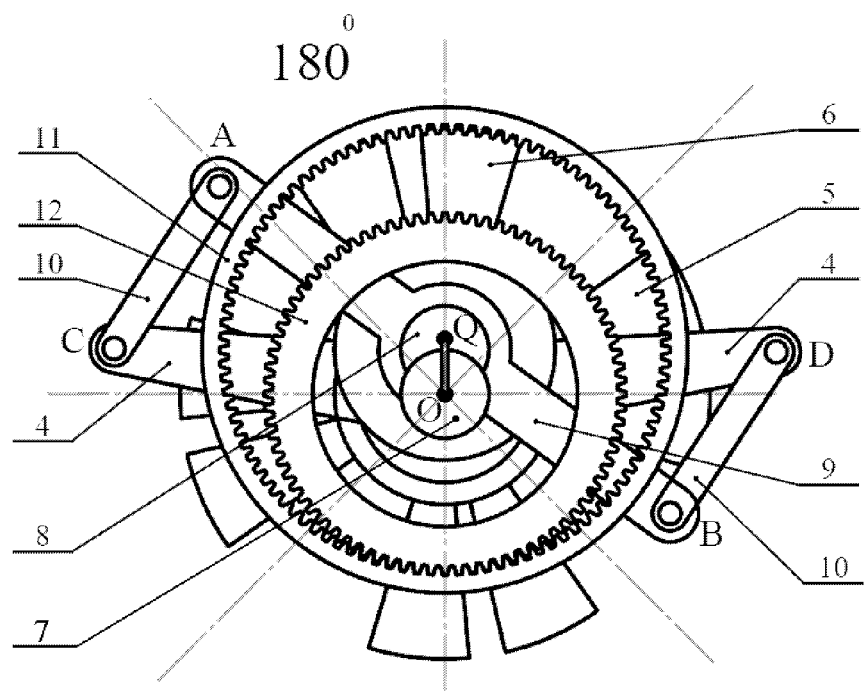
Figure 7:
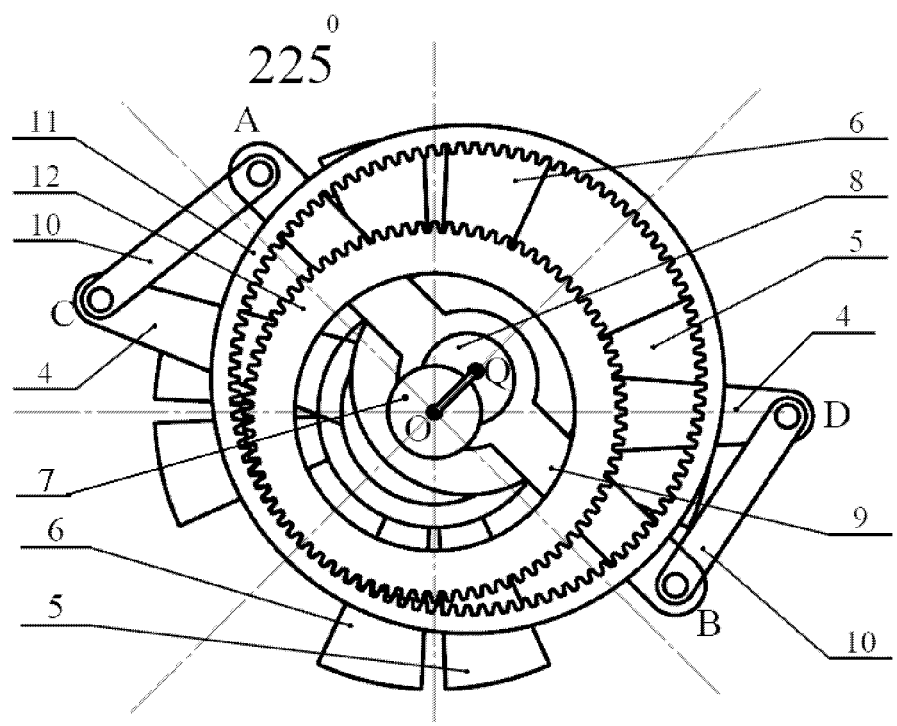
Figure 8:
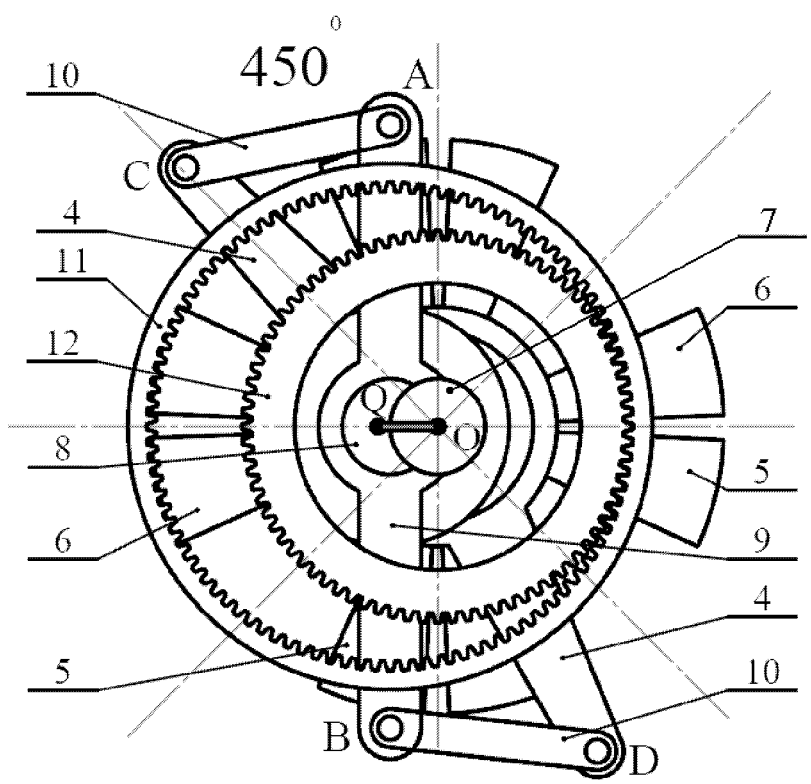
Figure 9:
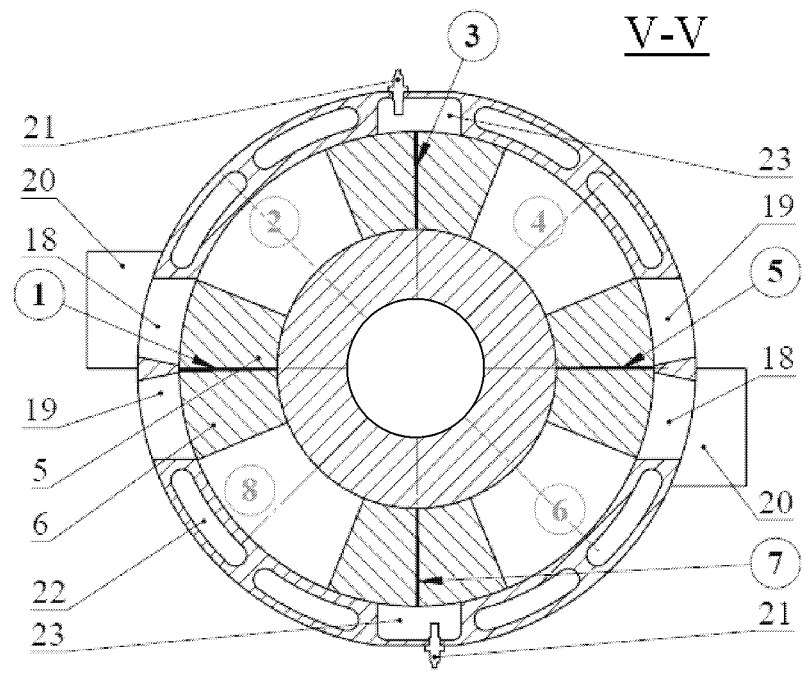
Figure 10:
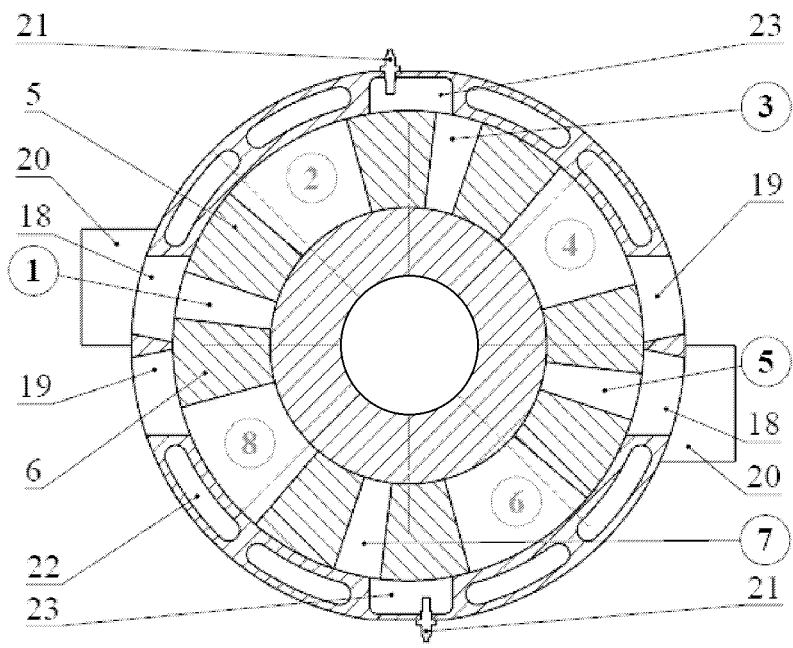
Figure 11:
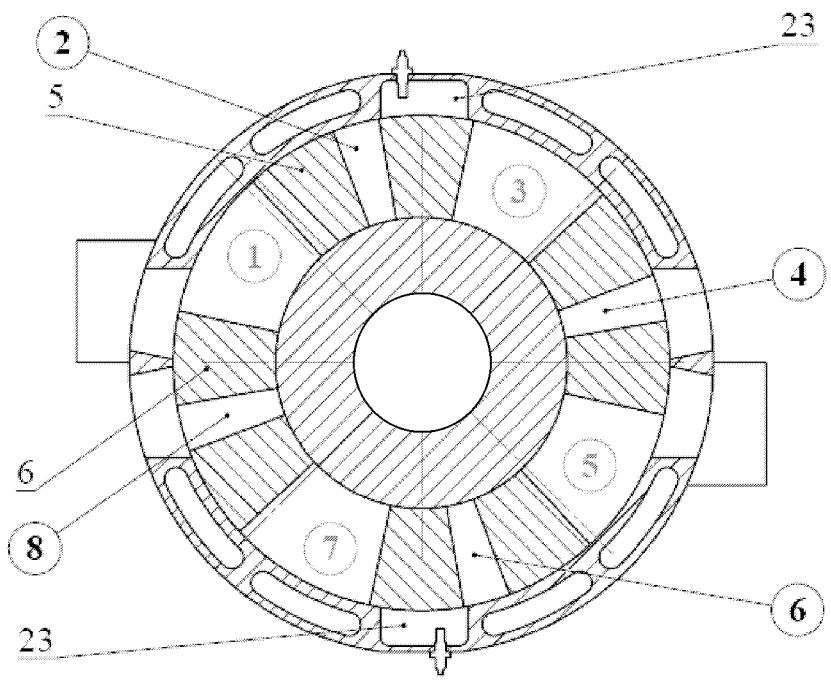
Figure 12:
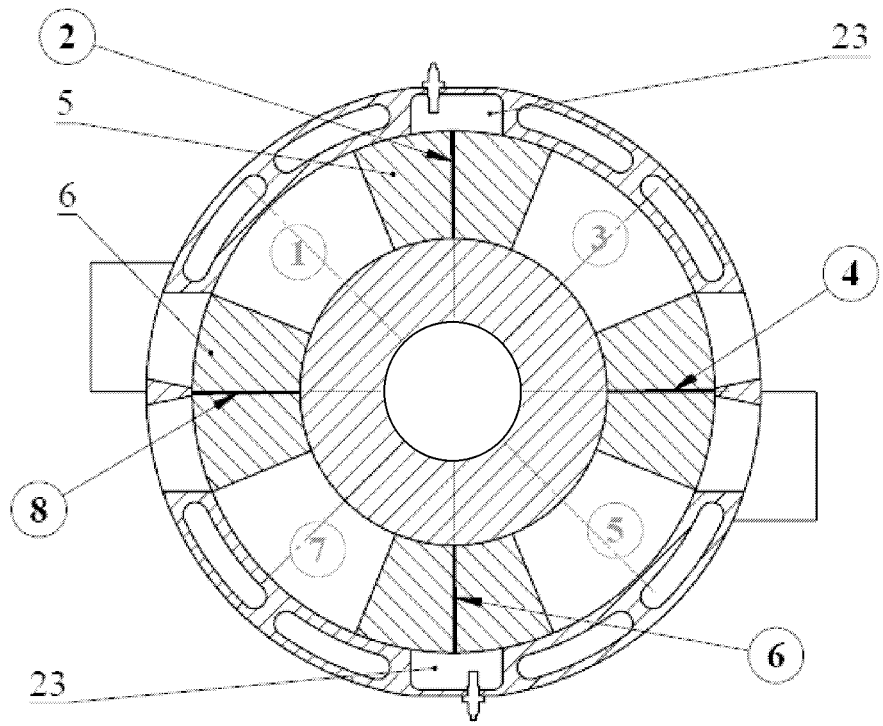
Figure 13:
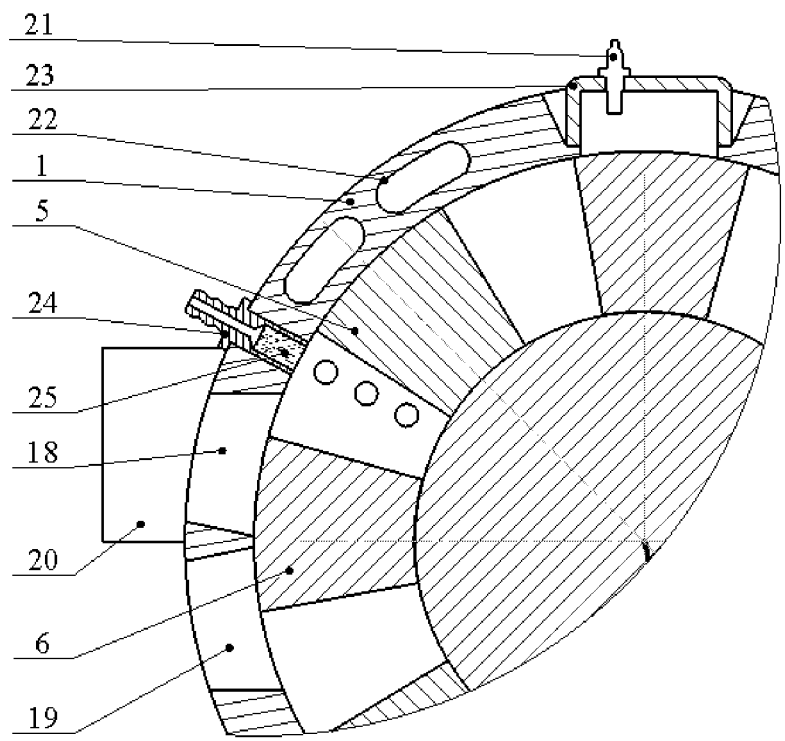
FIG. 13 shows the union of the lubricator to supply oil to the working chamber.
Figure 14:
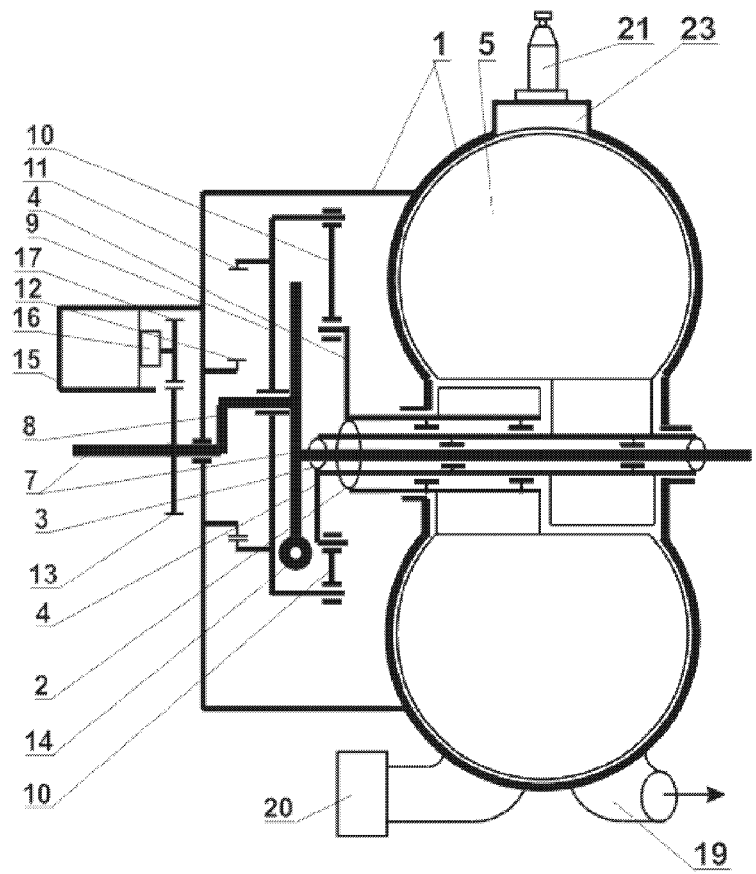
FIG. 14 shows a single-section HICE with a toroidal working chamber.
Figure 15:
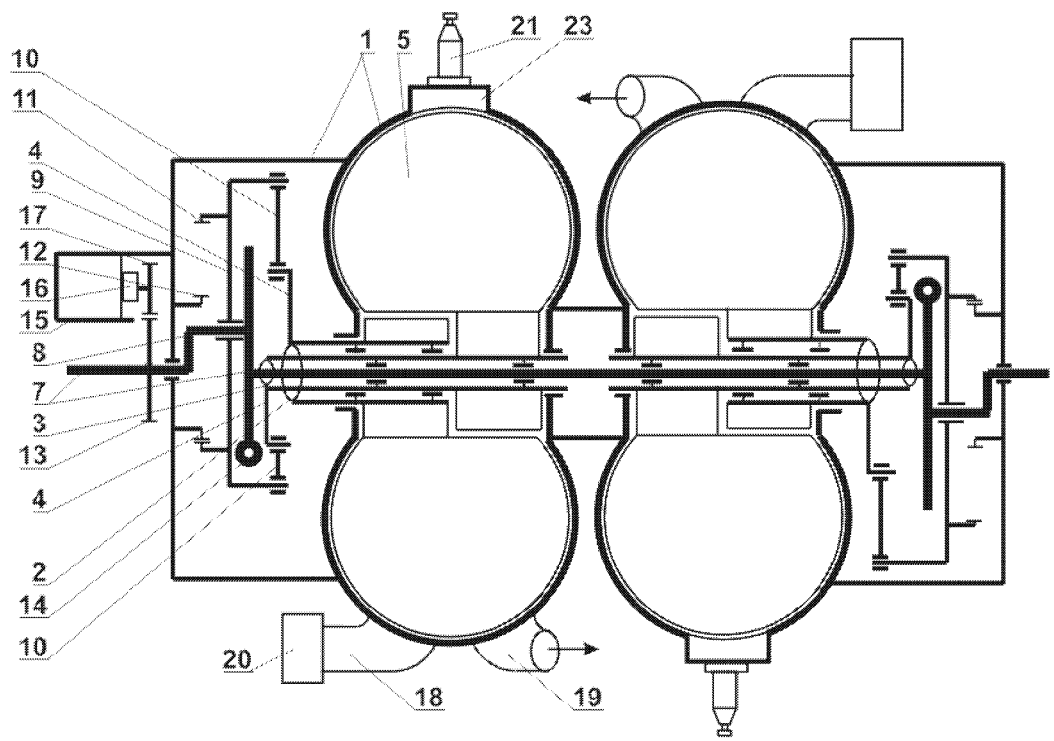
FIGS. 15-17 show a two-section HICE and approximated schedules of torque.
Figure 16:
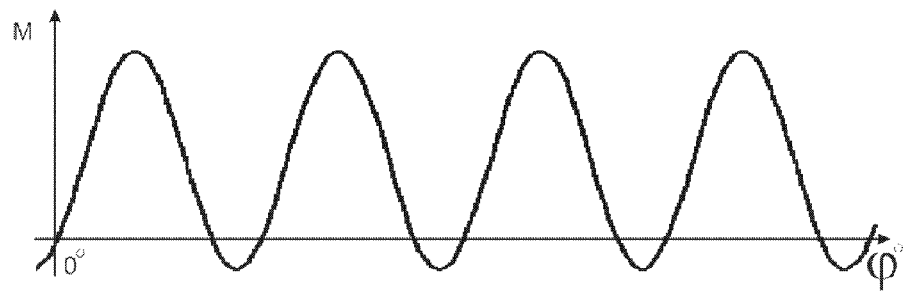
Figure 17:
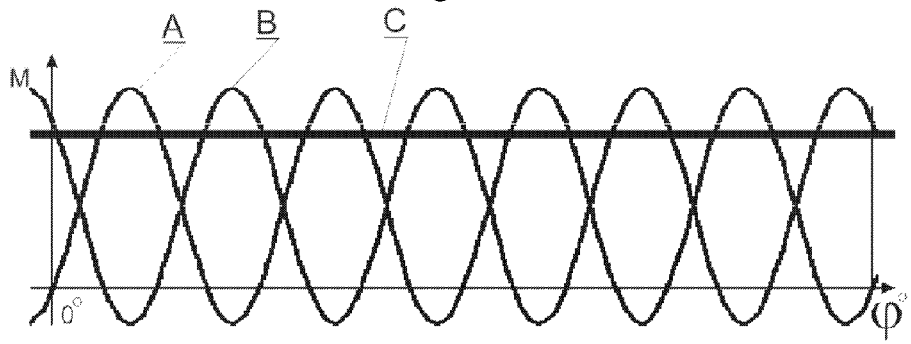
Figure 18:
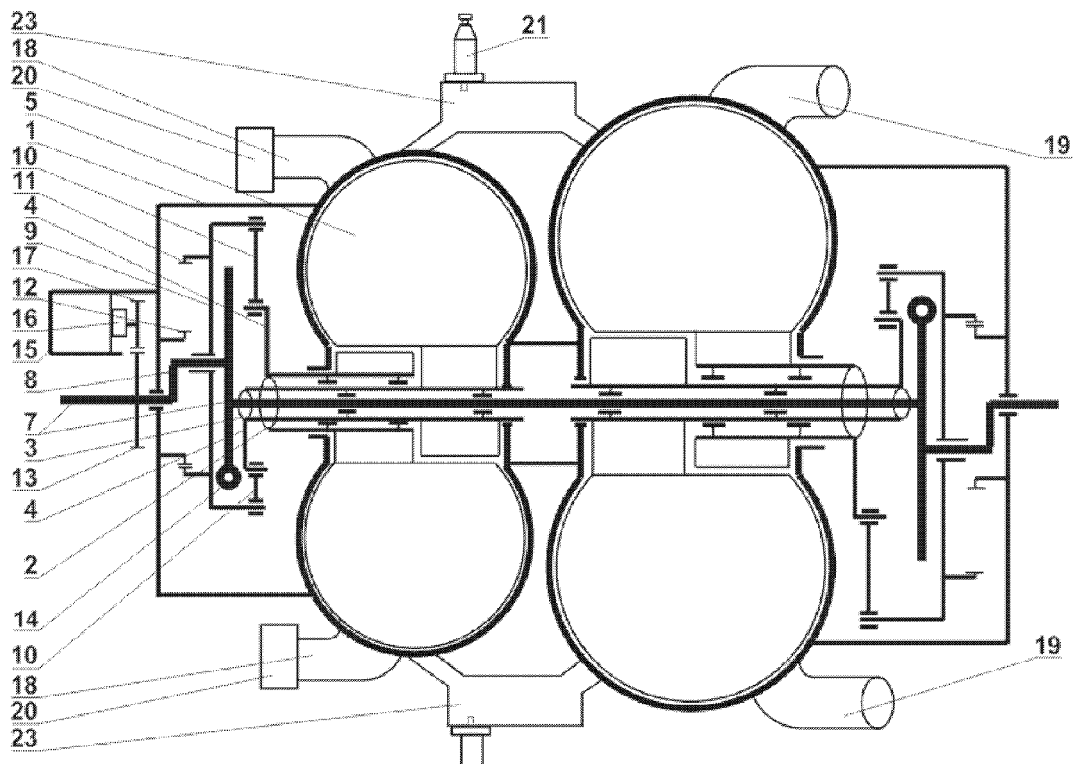
FIGS. 18-22 show a two-section HICE and its compressor and expander sections.
Figure 19:
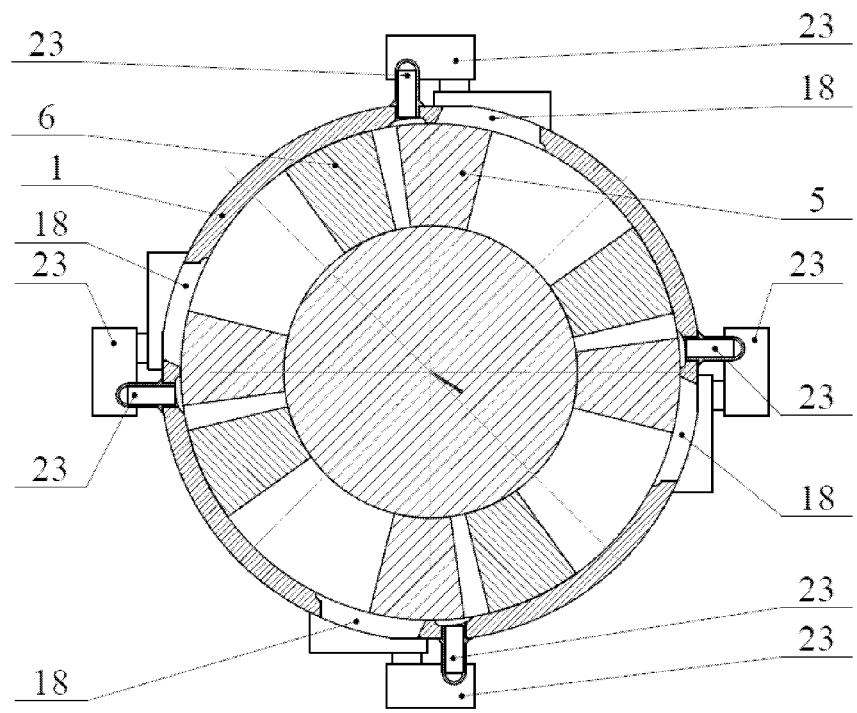
Figure 20:
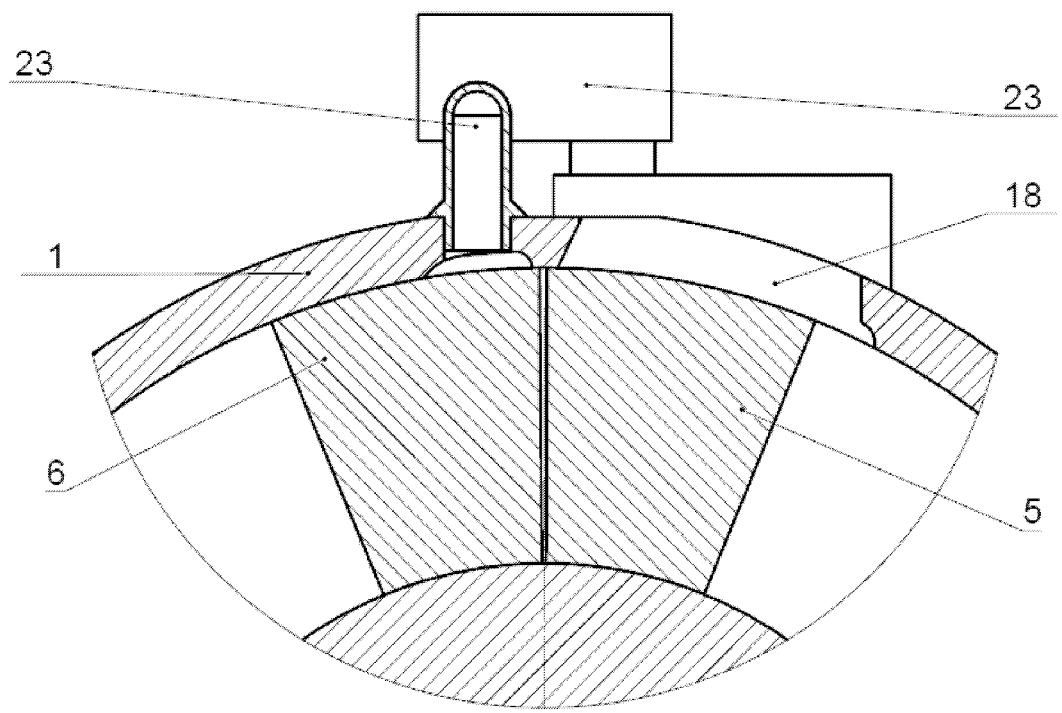
Figure 21:
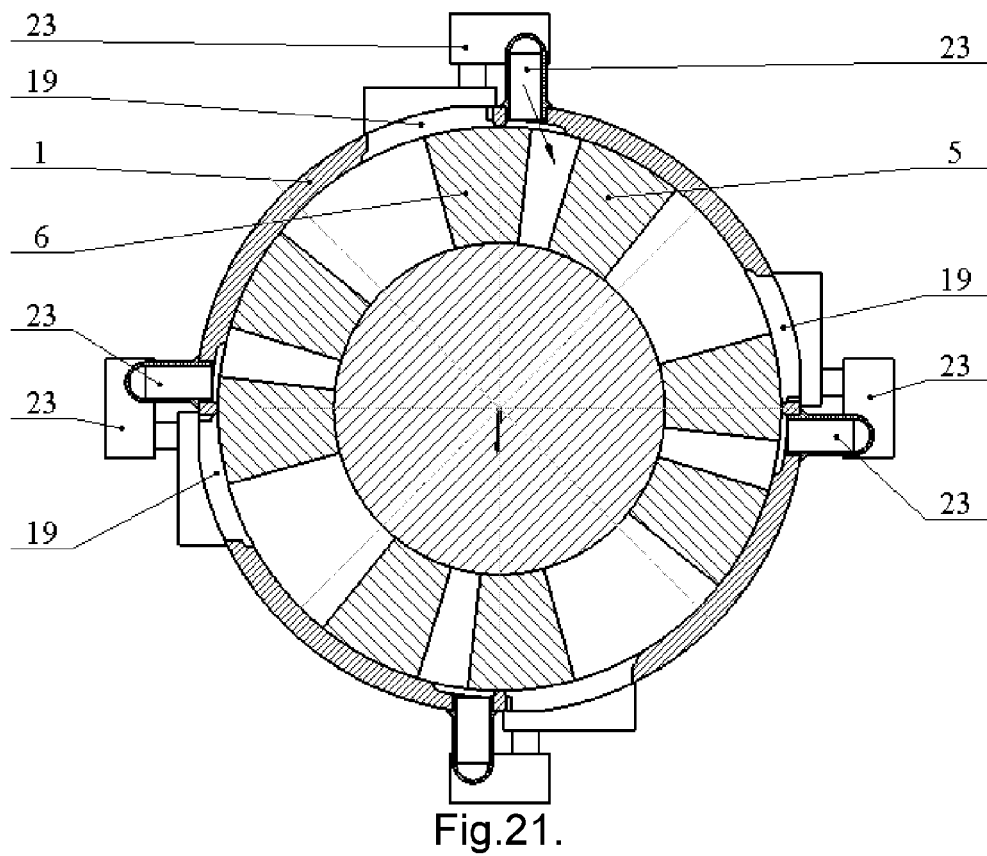
Figure 22:
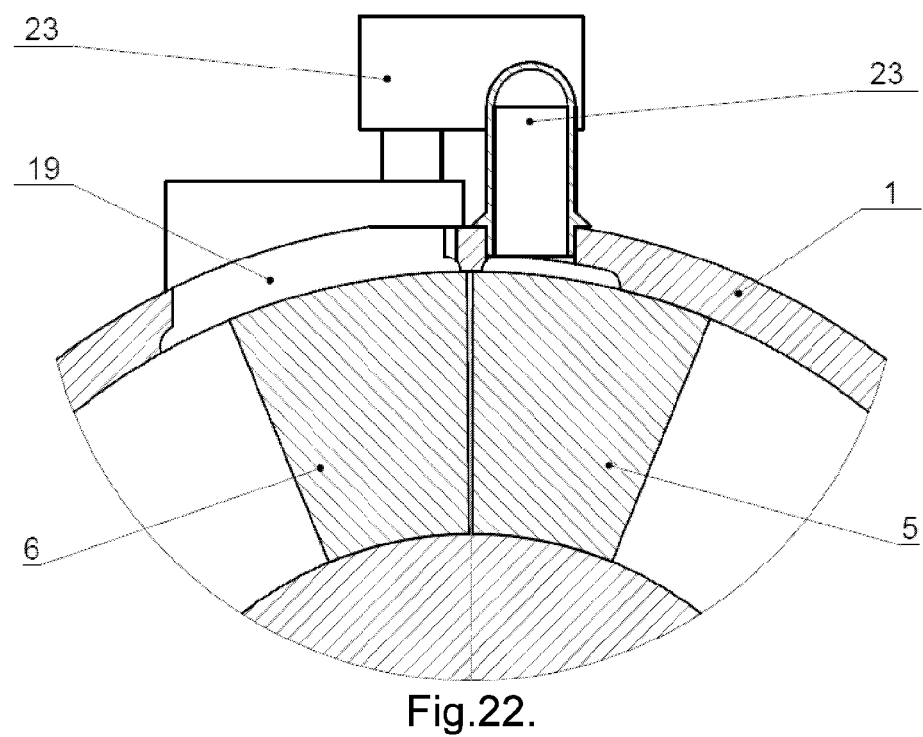
Figure 23:
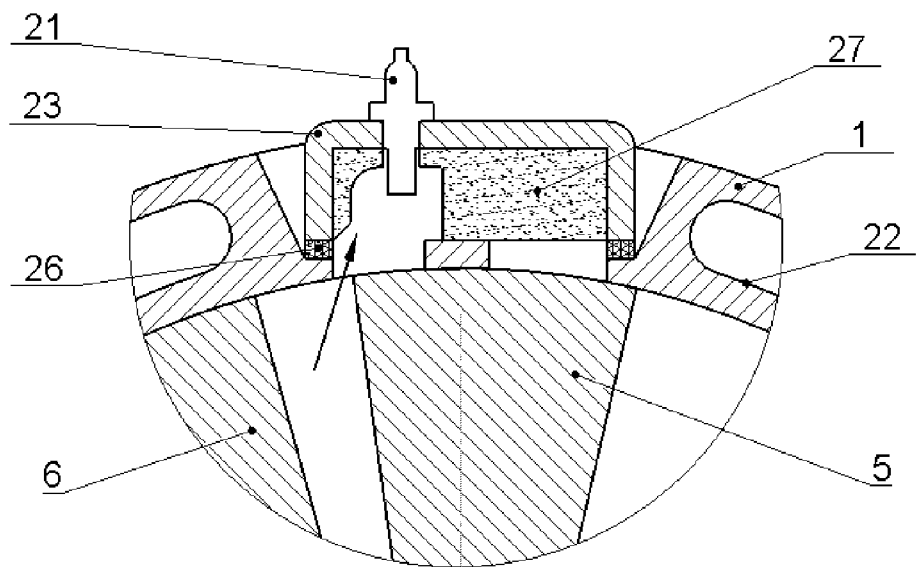
FIGS. 23-30 show design options of overflow channels.
Figure 24:
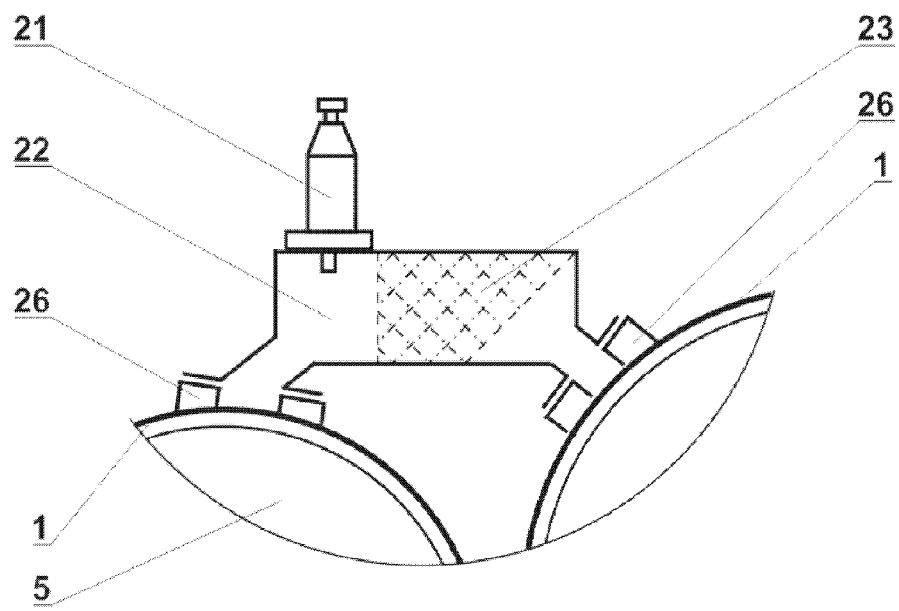
Figure 25:
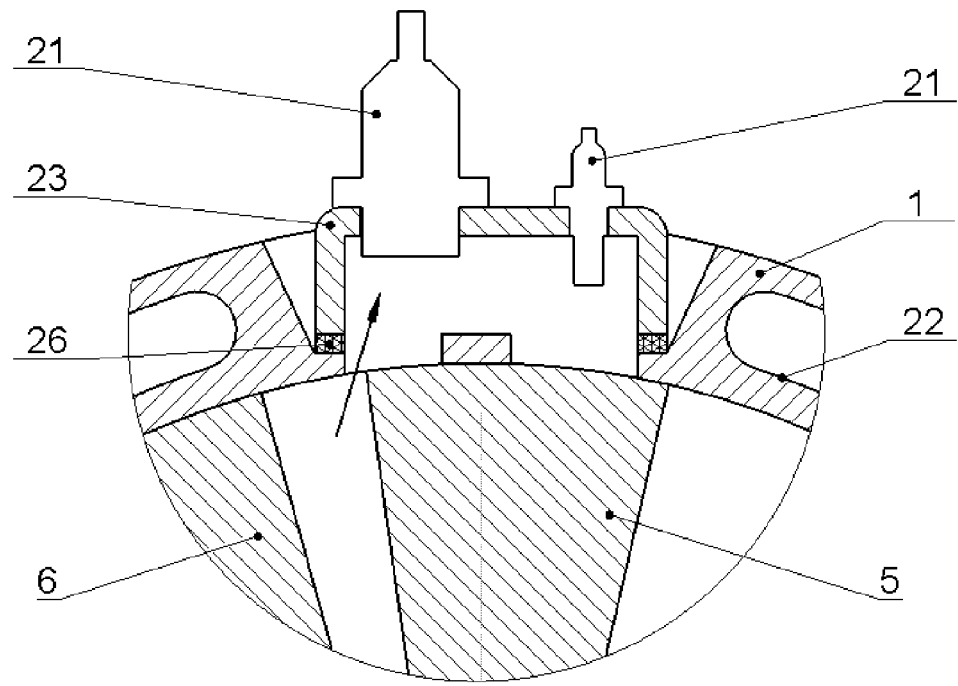
Figure 26:
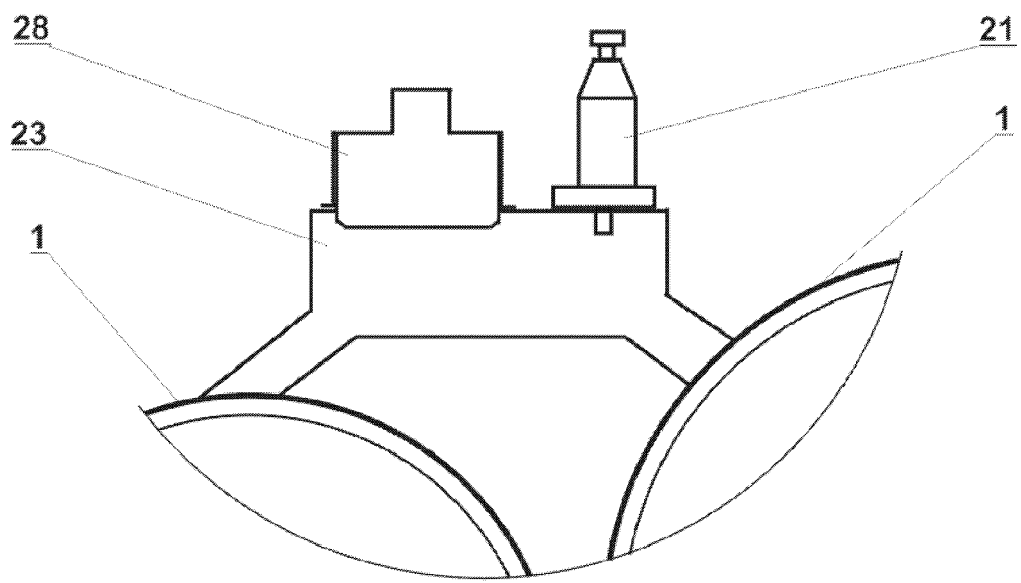
Figure 27:
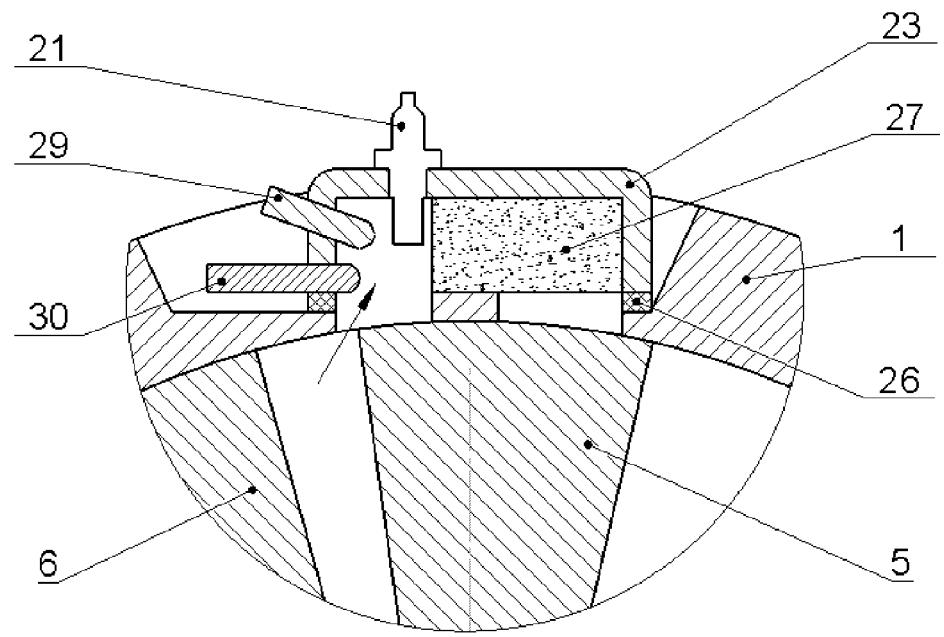
Figure 28:
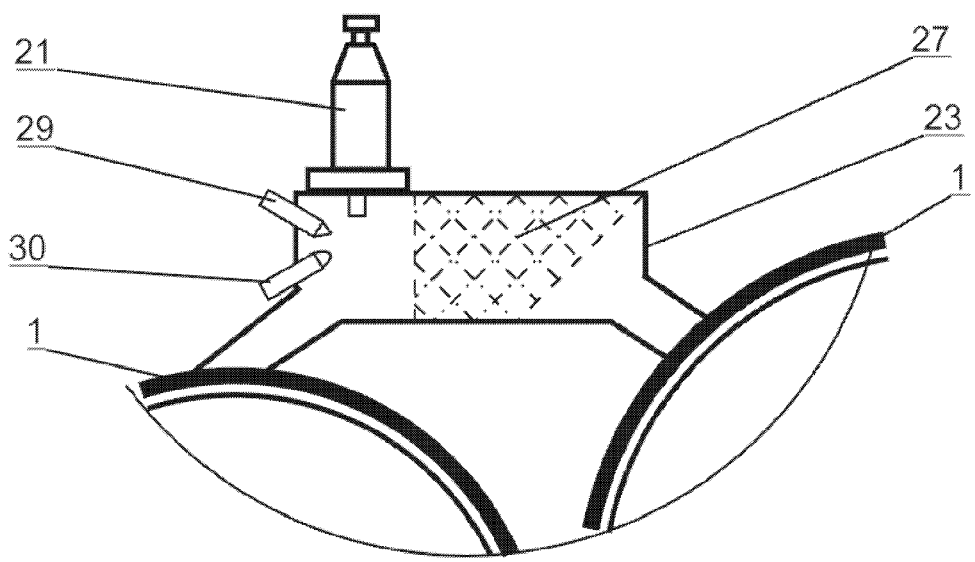
Figure 29:
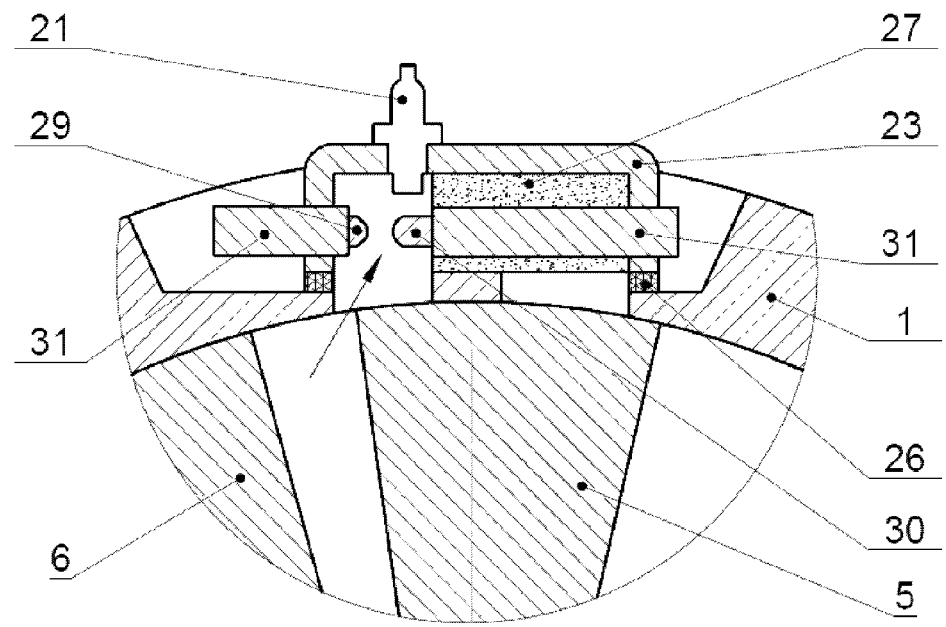
Figure 30:
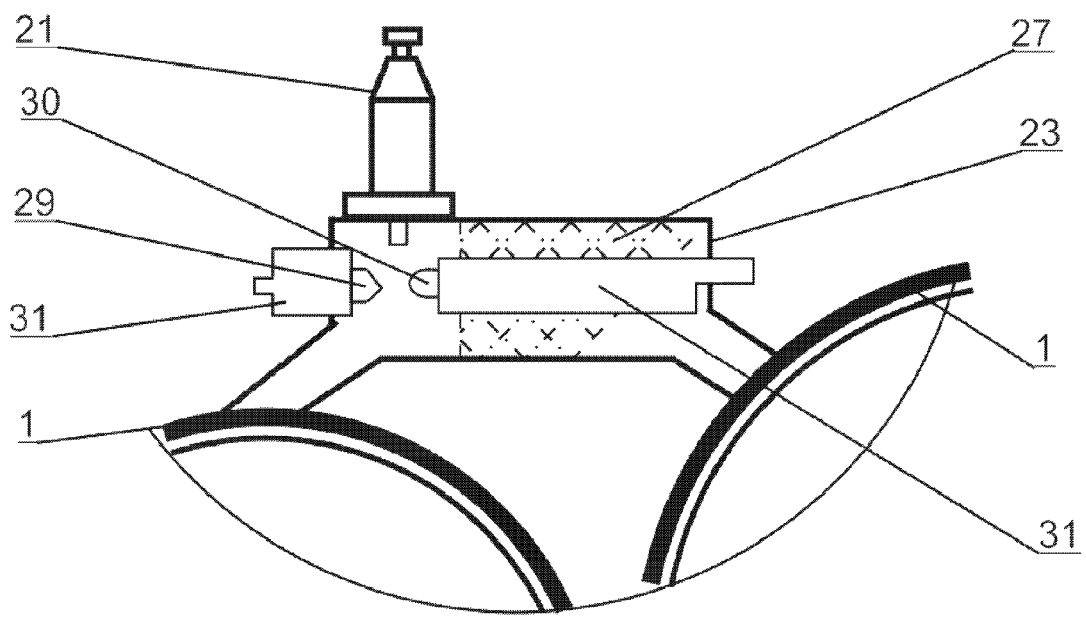
Figure 31:
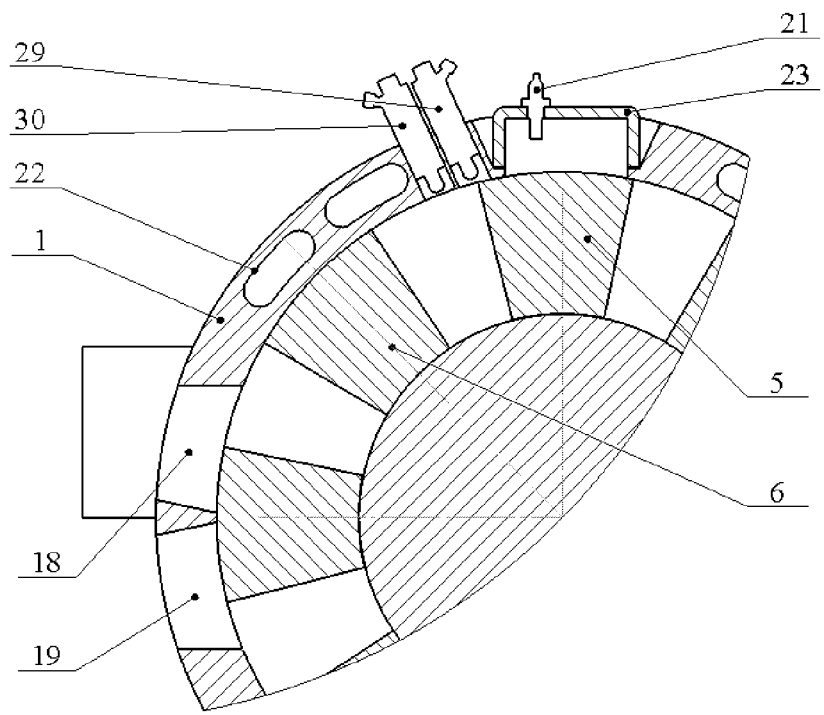
FIG. 31 shows a HICE with internal mixture formation.
Figure 32:
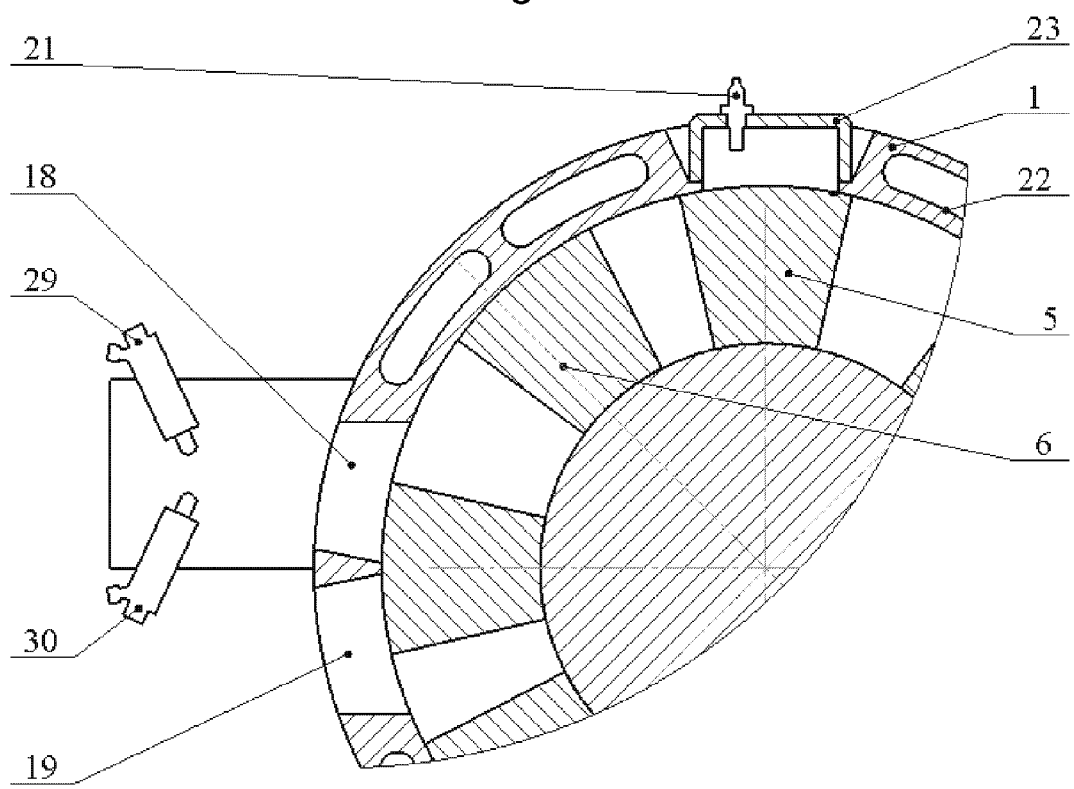
FIGS. 32-35 show HICE design options with external mixture formation.
Figure 33:
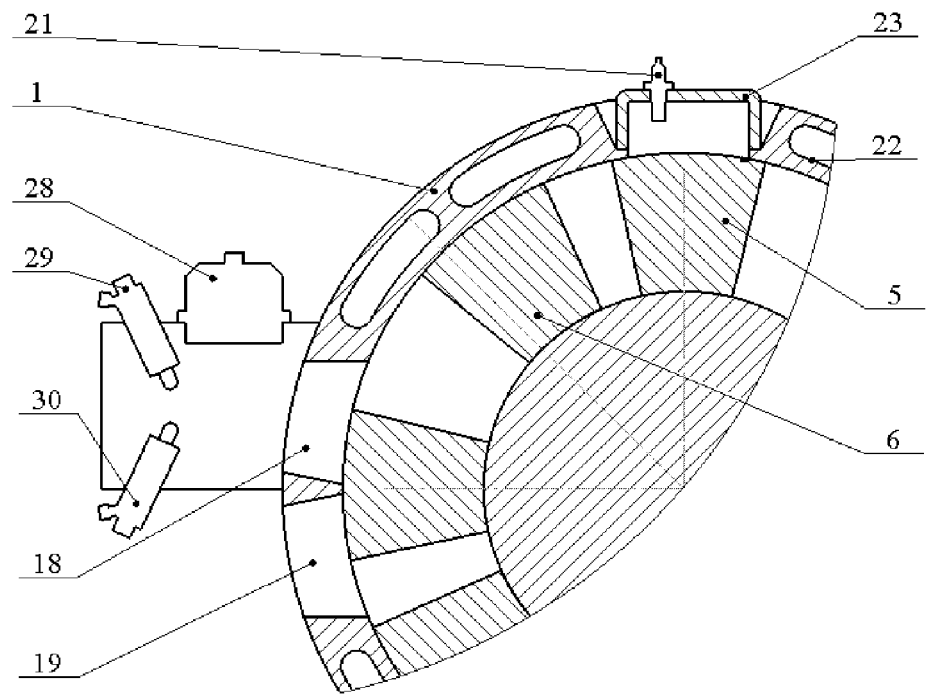
Figure 34:
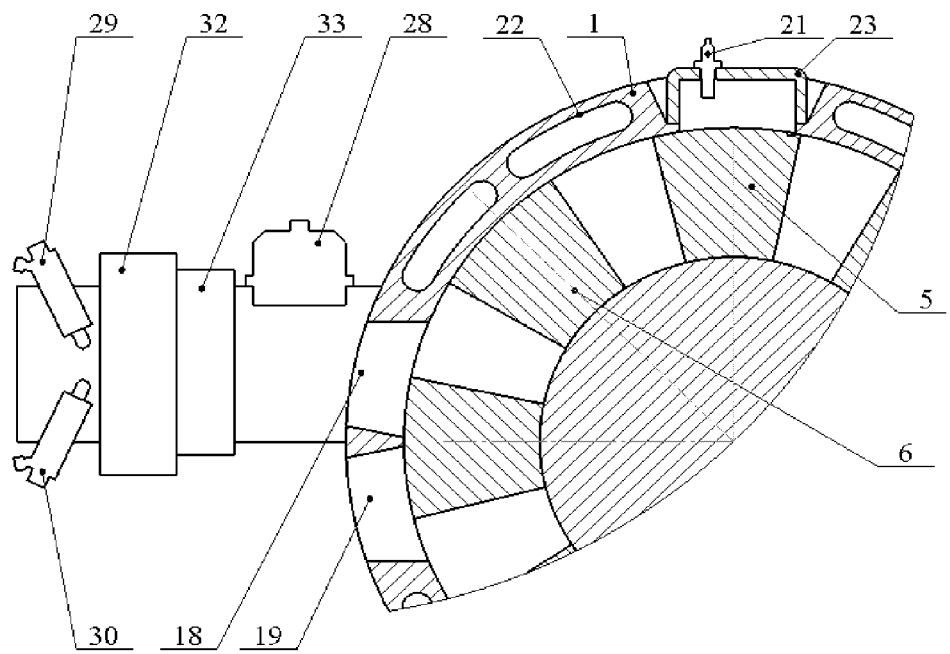
Figure 35:
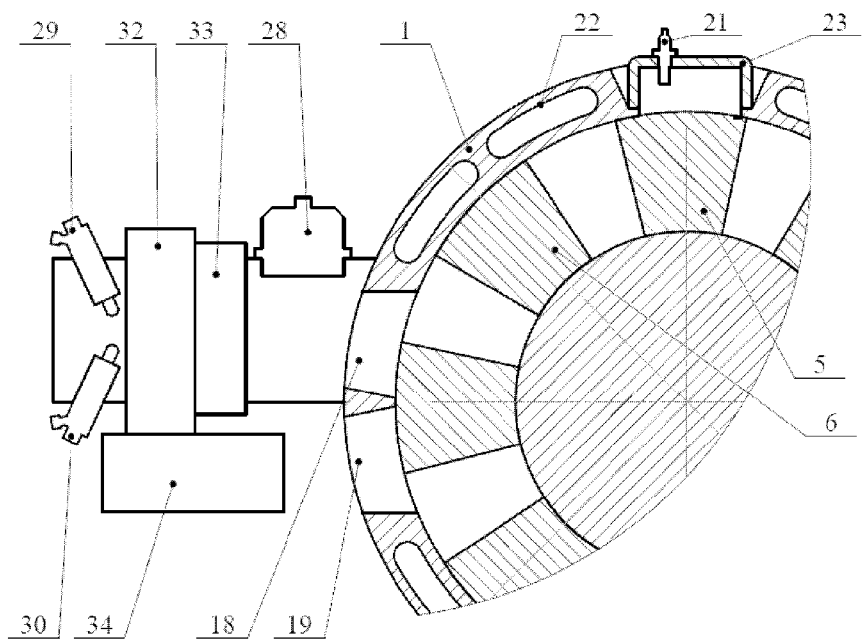
Figure 36:
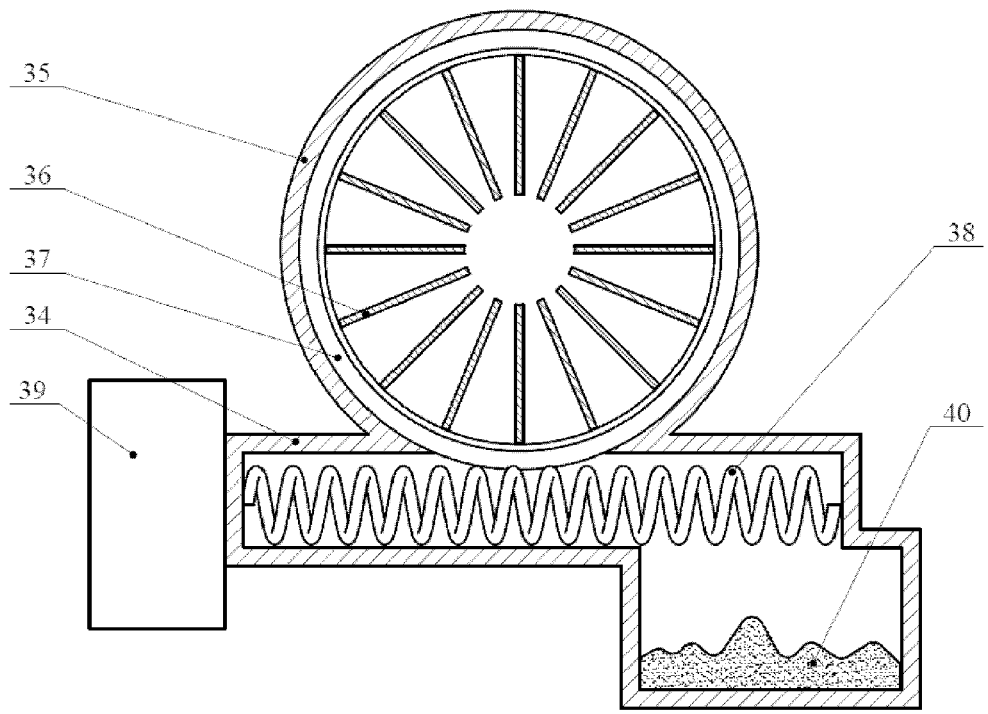
FIG. 36 depicts a turbocharger with a dust carrier.

The excentricity of the offset portion is designated by letters OQ, while the axis of the output shaft and the coaxial drive shafts as well as of the annular working chamber is designated by letter O;

a pair of connecting rods designated by letters AC and BD connect the carrier AB with the arms CO and DO coaxial drive shafts:

FIG. 2 shows the initial angular position of the pistons and of their drive mechanism where the initial (lower) angular position of the offset portion of the output shaft is 0° (360°, 720°, etc.) and the horizontal position of the carrier AB;

FIG. 3 shows a view similar to FIG. 2 but with the output shaft turned through 45° clockwise (405°, 765°, etc.);

FIG. 4 shows a view similar to FIG. 2 but with the output shaft turned through 90°;

FIG. 5 shows a view similar to FIG. 2 but with the output shaft turned through 135°;

FIG. 6 shows a view similar to FIG. 2 but with the output shaft turned through 180°;

FIG. 7 shows a view similar to FIG. 2 but with the output shaft turned through 225°;

FIG. 8 shows a view similar to FIG. 2 but with the output shaft turned through 450°;

FIG. 9 shows the position of instant subchambers of the RPM with closed sides of the pistons (conditionally initial position of the pistons is 0° (360°, 720°, etc.));

FIG. 10 and 11 show the position of instant subchambers of the RPM with a dynamic change of the instant subchambers within the range of turning of the output shaft through an angle, which is greater than 0° (360°, 720°, etc.) and less than 225°;

FIG. 12 shows the position of instant subchambers of the RPM with closed sides of the pistons (the output shaft position is a multiple of 225°) in the case of the planetary gearing transmission ratio i=(4+1)/4 for 4 pistons on each of the drive shafts;

FIG. 13 shows the union of the lubricator to supply oil to the working chamber;

FIG. 14 shows a single-section HICE with a toroidal working chamber;

FIG. 15 shows a two-section HICE with toroidal working chambers;

FIGS. 16 and 17 show approximated graphs of the torque of a single-section and two-section HICE, respectively;

FIG. 18 shows a two-section HICE with toroidal cavities of different volumes;

FIGS. 19 and 20 show an instant angular position of the pistons during operation of the compression section;

FIGS. 21 and 22 show an instant angular position of the pistons during operation of the expansion section;

FIGS. 23 and 24 show overflow channels of the single-section and two-section HICE, respectively, which channels are lined/filled with a gas-permeable porous heat-resistant ceramics;

FIGS. 25 and 26 show overflow channels of the single-section and two-section HICE, respectively, which are equipped with an activator;

FIGS. 27 and 28 show overflow channels of the single-section and two-section HICE, respectively, which are equipped with a porous ceramics, a fuel nozzle and a nozzle for directing an additional working fluid;

FIGS. 29 and 30 show overflow channels of the single-section and two-section HICE, respectively, which are equipped with a porous ceramics and a heat exchanger(s), a fuel nozzle and a nozzle for directing an additional working fluid;

FIG. 31 shows a fragmentary view of the HICE with a fuel nozzle and a nozzle for directing an additional working fluid disposed in the casing between the inlet port and the overflow channel;

FIG. 32 shows a fragmentary view of the HICE with a fuel nozzle and a nozzle for directing an additional working fluid disposed in the inlet port;

FIG. 33 shows a fragmentary view of the HICE with an activator, a fuel nozzle and a nozzle for directing an additional working fluid disposed in the inlet port;

FIG. 34 shows a fragmentary view of the HICE with an activator, intercooler, turbocharger, a fuel nozzle and a nozzle for directing an additional working fluid disposed in the inlet port;

FIG. 35 shows a fragmentary view of the HICE with an activator, intercooler, turbocharger with a dust carrier, a fuel nozzle and a nozzle for directing an additional working fluid all attached to the inlet port;

FIG. 36 shows the turbocharger with a dust carrier.

Figure 1:
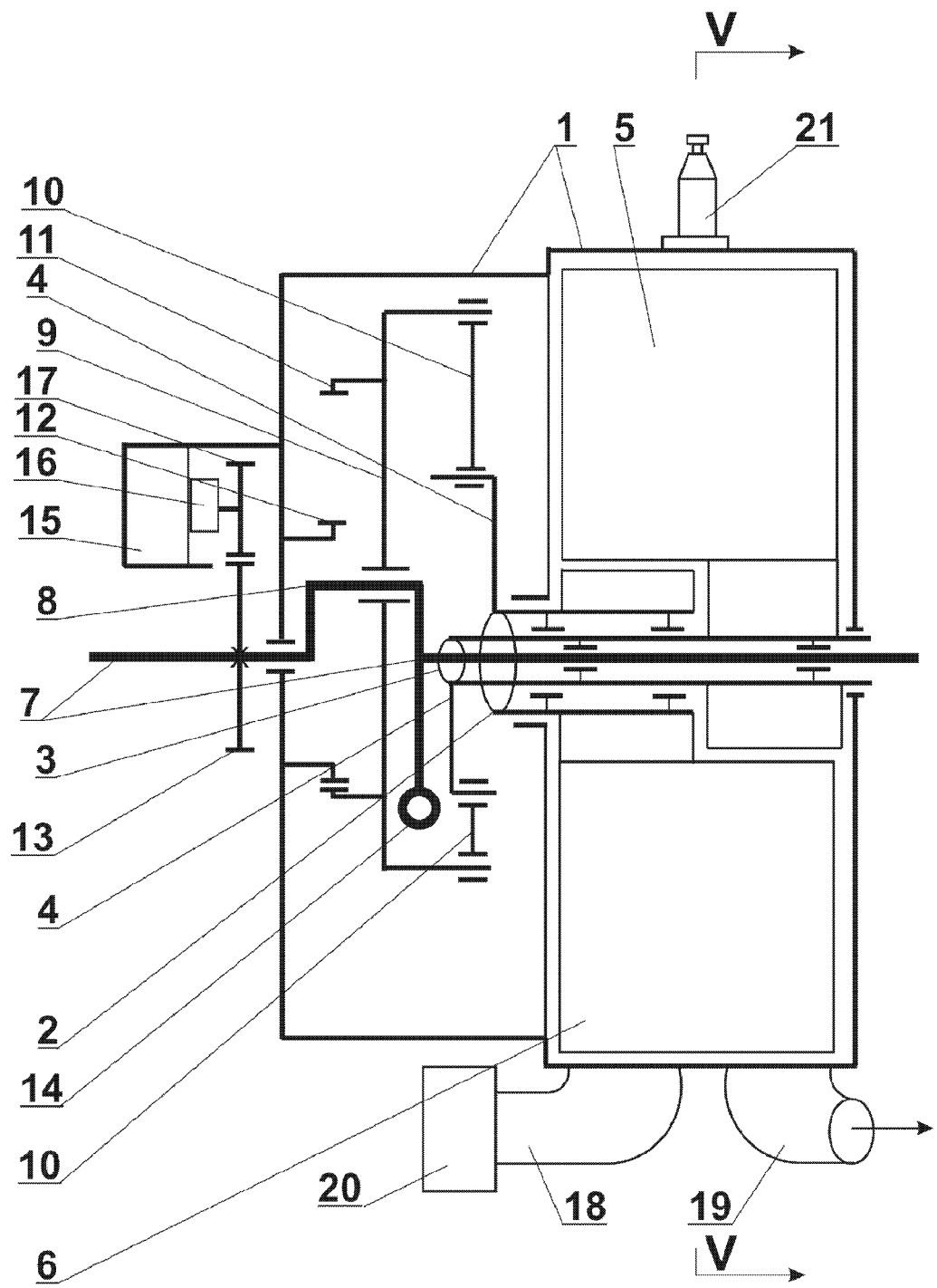
FIGS. 1, 9-12 depict an RPM with a planetary mechanism for the special case of the gear ratio values of the planetary gearing i=(4+1)/4 (wherein 4 is the number of rotary pistons on each shaft of the RPM). In general, i=(n+1)/n (where n=2, 3, 4, 5, etc., while n is the number of rotary pistons on each of the shafts of the RPM), as the structural basis of the positive displacement RPM for different purposes (for example, internal combustion engines)

In FIG. 1, arrows 14 and 15 show the predominant direction of movement of the exhaust gases from the rotary internal combustion engine exhaust port. FIGS. 19, 21, 23, 25, 27, 29 the arrows show the predominant direction of the working fluid/gas relative to the overflow channel.

BEST MODES FOR CARRYING OUT THE INVENTION

Hereinafter, the positive-displacement rotary-piston internal combustion engine and the kinematical mechanism thereof will be described by way of referring to the drawings where schematically shown are:

a casing 1 having an annular working chamber;
an external drive shaft 2;
an internal drive shaft 3;
arms 4 on the external and internal shafts 2 and 3;
axially symmetrical rotary pistons 5 and 6 rigidly mounted on the coaxial drive shafts 2 and 3 respectively. Pistons 5 and 6 have radial seals and end-face seals (not shown);
an output shaft 7 shown in FIGS. 1, 14, 15 and 18 by a heavy line;
an offset portion 8 on the output shaft 7, shown as a U-bend in FIG. 1,
a carrier 9 journalled on the offset portion 8 of the output shaft 7,
connecting rods 10 linking the carrier 9 to the arms 4,
a planetary gear 11 fixed on the carrier 9,
a stationary central gear 12 meshing with the planetary gear 11 and coaxial with the drive shafts 2 and 3, the output shaft 7, and the annular working chamber of the casing (section) 1,
a gear 13 fixed on the output shaft 7,
a flywheel 14 for balancing the masses of the offset portion 8, the carrier 9, the planetary gear 11, and the connecting rods 10,
a starter 15 mounted on the casing 1,
an overrunning clutch 16,
a gear 17 mounted on the overrunning clutch 16 and meshing the gear rim 13,
an intake port 18 communicating with the working chamber of the casing (section) 1,
an exhaust port 19 also communicating with the working chamber of the casing (section) 1,
a carburettor 20 (for use in an external carburetion only),
a spark plug 21
walls 22 defining spaces for cooling the casing (section) 1,
an overflow channel 23 adjacent to the casing (section) 1,
an oil union 24,
a permeable material 25 of the oil union 24;
a heat insulator 26;
a gas-permeable heat-resistant ceramics 27;
an activator 28,
a fuel nozzle 29,
a nozzle 30 for directing an additional working fluid,
a heat exchanger 31,
a turbocharcher 32,
an intercooler 33,
a dust carrier 34,
a common housing 35 for the turbocharcher 32 and dust carrier 34,
an impeller 36 of the turbocharcher 32,
an annular channel 37 for dust removal,
a screw and/or helical spring 38,
a drive 39 for the screw and/or helical spring 38,
a dust bin 40.

The operation of the positive displacement rotary-piston machine will now be described by the operation of the simplest rotary-piston internal combustion engine having a planetary pair with the gear ratio i=5/4 (FIG. 1) and 4 rotary pistons 5 and 6 arranged in the working chamber of the casing (section) 1 and mounted on the coaxial drive shafts 2 and 3. When the engine is being put in operation, the starter 15 is energized and, by way of the overruning clutch 16 and the gear 17, causes the heavy gear 13 to rotate together with the output shaft 7 rigidly connected to the gear 13 and having the offset portion 8 as an integral part thereof. The planetary gear 11 and the carrier 9 both arranged on the offset portion 8 began motion as their common axis Q moves about axis O. The planetary gear 11 meshes with the central gear 12 and the meshing point represents a "zero" instantaneous velocity for the planetary gear 11 and the carrier 9. The motion is further transmitted from the carrier 9 via the connecting rods 10 to the arms 4 of the drive shafts 2 and 3 carrying the rotary pistons 5 and 6, which began rotationally oscillate in the working chamber of the casing 1.

This motion is the result of continuous variations in the angular position and an instantaneous distance to the arms of the carrier 9 with respect to the "zero" point of instantaneous velocities, the point being the pitch point of the gears in the planetary gearing system. The arms of the carrier 9 through the connecting rods 10 move the arms 4 of the coaxial shafts 2 and 3. This is why the rotary pistons 5 and 6 mounted thereon are set in rotational and oscillatory motion. At the same time, the output shaft 7 together with the offset portion 8, the carrier 9 and the drive shafts 2 and 3 together with the rotary pistons 5 and 6 are moving in the same direction. In this manner, a minimal difference in angular velocities (and also linear translation) in friction pairs is achieved to minimize frictional losses of useful energy. Thus efficiency of the engine is enhanced.

Referring to FIGS. 2 through 10, there is shown an operation of the planetary gear with the planetary gear ratio i=3/4 for various output shaft 7 positions. Accordingly, the members of the kinematic gear train and the rotary pistons 5 and 6 take a strongly deterministic position. In this case, used as a coordinate grid of the rotary piston internal combustion engine kinematic train there will be used thin dot-and-dash vertical and horizontal axes in FIGS. 2-10, which extend through the axes of the working chamber of the casing 1, the shafts 2, 3, 7.

Referring to FIG. 2, there is shown an arbitrarily chosen initial 0° position of the output shaft 7 (shown as point O) with the offset portion 8 (shown as point Q) and the corresponding position of the planetary gear 11 with the carrier 9, of the connecting rods 10 and the arms 4 of the rotary pistons 5 and 6 relative to the stationary central gear 12 and the casing (section) 1. The eccentricity of the offset portion 8 of the output shaft 7 is designated by heavy line OQ initially extending vertically (axis Q is below axis O of the shafts 2, 3, and 7), while the carrier 9 designated AB is positioned horizontally. The carrier 9 is linked with the drive shafts 2 and 3 by means of the connecting rods 10 shown as straight lines designated AC and BD. At the initial position, the rotary pistons 5 and 6 are symmetrical with respect to the vertical and horizontal axes. The distance between the sides of the rotary pistons 5 and 6 is minimal.

Next, the output shaft 7 together with the offset portion 8 rotates clockwise about axis O. At the same time, by virtue of mechanical linkages, the planetary gear 11 rolls over the stationary central gear 12. The planetary gear 11 imparts motion to the carrier 9, which is rigidly connected to the planetary gear 11. This causes continuous variations in the movement of the arms QA and QB of the carrier 9 (both the direction and velocity) with respect to the "zero" point of instantaneous velocities where the point is the pitch point of the gears 11 and 12. These variations in velocities are transmitted via the connecting rods 10 from the axes of arms A and B of the carrier 9 to the axes C and D of the arms 4 of the coaxial drive shafts 2 and 3, and further to the pistons 5 and 6. In this manner the pistons are caused to rotationally oscillate in the annular working chamber of the casing 1.

Referring to FIG. 3, the output shaft 7 and the offset portion 8 (with the eccentricity OQ) are shown as turned through 45° clockwise about axis O. The planetary gear 11 with the carrier 9 are also shown as accordingly turned. At the same time, by virtue of mechanical linkages, the sides of the rotary pistons 5 and 6 are accordingly moved apart.

Because the angles φ1 and φ2 are constant, the connecting rods 10 designated AC and BD are moved apart by the arms 4 designated OC and OD to form an angle Δ2>Δ1. The pistons 5 and 6 are also moved apart by a corresponding amount.

FIGS. 4, 5, and 6 illustrate further rotation of the output shaft 7 in a clockwise direction about axis O successively through 90°, 135°, and 180°. By virtue of mechanical linkages, the sides of the rotary pistons 5 and 6 move apart or close.

When the output shaft 7 has further rotated in a clockwise direction through an angle of 225° (FIG. 7), the rotary pistons 5 and 6 are found to be moved apart a short distance (see the upper left-hand portion of the drawing), while the other pistons or those adjacent to the pistons just mentioned close (see the lower portion of FIG. 7) because they are axially symmetric.

FIG. 8 shows a further rotation of the output shaft 7 in a clockwise direction through an angle of 450°. At this angle, the sides of some pistons 5 and 6 are closed again, and the adjacent pistons 5 and 6 are moved the maximum distance apart. At an angle of 450°, the carrier 9 is upright. Thus, when the gear ratio of the planetary gear pair is i=5/4 (see FIGS. 1-8) and with four rotary pistons 5 and 6 on each of the coaxial drive shafts 2 and 3, the rotary pistons 5 and 6 perform rotationally oscillating motion in the working chamber. In this case, with rotation of the output shaft 7, the pistons move apart and close at a multiple of 225° for a minimal distance at one and the same place in the working chamber of the casing 1 relative to the starting position. This ensures a constant phase position while closing the sides of the pistons 5 and 6 with respect to the working chamber of the casing 1 and the central gear 12, the inlet 18 and outlet ports 19, and the flow channels 23.

FIGS. 9-12 show a sectional view of the casing 1 (see FIG. 1) of the simplest RPICE through the annular chamber for various positions of the pistons 5 and 6 when the drive shaft 7 has been turned through 225°. Such RPICE has an intake port 18 and outlet port 19 separated by a partition (not shown) of the casing 1. The operation of the planetary gear of such RPICE has been discussed in greater detail above (see FIGS. 2-8). In the annular working chamber of the RPICE, there are found eight variable (instant) subchambers providing space enclosed by the faces of the pistons 5 and 6 and by the casing 1. These eight instant working subchambers are designated in FIGS. 9-12 by encircled numerals from "1" to "8".

In FIG. 9 (the initial position of the output shaft 7), among the instant working subchambers "1" being the minimal volume enclosed between the intake port 18 and the exhaust port 19;

"2" being the largest volume corresponding to the completion of the intake stroke and the beginning of the compression stroke as in a rotary internal combustion engine;

"3" being the minimal volume enclosed opposite the "upper" overflow channel 23;

"4" being the largest volume corresponding to the completion of the combustion stroke and the beginning of the exhaust stroke as in a rotary internal combustion engine;

"5" being the minimal volume enclosed between the intake port 18 and the exhaust port 19;

"6" being the largest volume corresponding to the completion of the intake stroke and the beginning of the compression stroke as in a rotary internal combustion engine;

"7" being the minimal volume enclosed opposite the "lower" overflow channel 23;

"8" being of the maximal volume, corresponding to the completion of the combustion stroke and the beginning of the exhaust stroke as in a rotary internal combustion engine;

In FIG. 10, among the instant working subchambers

"1" being connected through the intake port 18 with the fuel supply equipment/carburettor 20 (for use with an external carburetion only) and having an increasing volume corresponding to the beginning of the intake stroke as in a rotary internal combustion engine;

"2" being a closed subchamber of a decreasing volume corresponding to the running of the compression stroke as in a rotary internal combustion engine;

"3" being connected to the "upper" overflow channel 23 and having an increasing volume corresponding to the beginning of the combustion stroke as in a rotary internal combustion engine;

"4" communicating with the exhaust port 19 and being of a decreasing volume corresponding to the running of the exhaust stroke as in a rotary internal combustion engine;

"5" being connected through the intake port 18 with the fuel supply equipment/carburettor 20 (for use with an external carburetion only) and having an increasing volume corresponding to the beginning of the intake stroke as in a rotary internal combustion engine;

"6" being a closed subchamber of a decreasing volume corresponding to the running of the compression stroke as in a rotary internal combustion engine;

"7" communicating with the "lower" overflow channel 23 and being of an increasing volume corresponding to the beginning of the combustion stroke as in a rotary internal combustion engine;

"8" communicating with the exhaust port 19 and being of a decreasing volume corresponding to the beginning of the exhaust stroke as in a rotary internal combustion engine;

In FIG. 11, among the instant working subchambers

"1" being connected through the intake port 18 with the fuel supply equipment/carburettor 20 and having an increasing volume corresponding to the running of the intake stroke as in a rotary internal combustion engine;

"2" being a closed subchamber of a decreasing volume corresponding to the running of the compression stroke as in a rotary internal combustion engine;

"3" being a closed subchamber of an increasing volume corresponding to the running of the combustion stroke as in a rotary internal combustion engine;

"4" communicating with the exhaust port 19 and being of a decreasing volume corresponding to the running of the exhaust stroke as in a rotary internal combustion engine;

"5" being connected through the intake port 18 with the fuel supply equipment/carburettor 20 and having an increasing volume corresponding to the running of the intake stroke as in a rotary internal combustion engine;

"6" being a closed subchamber of a decreasing volume corresponding to the running of the compression stroke as in a rotary internal combustion engine;

"7" being a closed subchamber of an increasing volume corresponding to the running of the combustion stroke as in a rotary internal combustion engine;

"8" communicating with the exhaust port 19 and being of a decreasing volume corresponding to the running of the exhaust stroke as in a rotary internal combustion engine;

FIG. 12 illustrates instant working subchambers that follow each other. It should be noted that the positions of the instant working subchambers shown in FIGS. 9 and 12, such as: 2 and 1, 3 and 2, 4 and 3, 5 and 4, 6 and 5, 7 and 6, 8 and 7 are alike, and the strokes of the RPICE run in a similar way.

In other words, the instant working subchambers in a rotary internal combustion engine sequentially reproduce the operation of an internal combustion engine. The sides of the adjacent rotary pistons 5 and 6 take intermediate positions and close onto each other to form a minimal space between them at the same positions in the casing 1 as the output shaft 7 rotates through 225° (FIGS. 9 and 12). The phase position of the rotary pistons 5 and 6 as well as their sides with respect to the intake ports 18, exhaust ports 19, overflow channels 23 is uniquely determined by the kinematic mechanism hereinbefore described in detail.

Where the output shaft 7 rotates through 225° (FIGS. 2, 7, and 8), the rotary pistons 5 and 6 will take an axially symmetric position relative to the initial position (FIG. 2). Consequently, the running cycle of a rotary internal combustion engine involving all four strokes will be sequentially reproduced at the same time in the "upper" and "lower" portions of the working chamber of the casing 1. Therefore, the running cycle of a rotary internal combustion engine involving all eight instant subchambers will again be sequentially reproduced each time as the output shaft 7 rotates through 900°.

A rotary internal combustion engine operates as follows. Fuel is supplied by the fuel supply equipment/carburettor 20 into the intake port 18 (where there is an external carburetion). The intake port 18 is arranged in the casing 1 having cooling cavities defined by walls 22. Then the fuel is mixed with air and enters increasing instant subchambers (FIGS. 10 and 11). This is an intake stroke. Next, the air-fuel mixture is compressed in closed decreasing instant subchambers (FIGS. 9, 10, and 11). This is a compression stroke. Then the decreasing instant subchambers start to inject the air-fuel mixture into the overflow channel 23 (FIG. 11 showing the starting position of the rotary pistons 5 and 6 prior to injection) under an excess pressure. The injection of the air-fuel mixture is initiated due to a design feature providing an excess pressure to unidirectionaly feed the air-fuel mixture into the overflow chambers 23 at the rated speed of the rotary internal combustion engine. Under such excess pressure, the rate of flow of the air-fuel mixture into the overflow chambers 23 is increased in comparison with the flame front propagation velocity [1, 2]. This ensures unidirectionality of the working fluid flow through the overflow channels 23 because this is required for such rotary internal combustion engine to operate.

In such an engine (with an external carburetion in carburettor 20), there is a sufficiently prolonged and qualitative mixing of fuel with air between the sides of rotary pistons during the compression stroke. The afterinjection of the air-fuel mixture into the overflow channel 23 results in further turbulance of the mixture. At the rated speed of a rotary internal combustion engine, the time of injection in the overflow channel 23 is shorter than the combustion delay [1, 2]. The fuel, therefore, is evaporated, reliably ignited, quickly and completely burned in the overflow channel 23 closed by means of the end faces of the rotary pistons 5 and/or 6 and heated to a high-temperature.

The initial ignition of the air-fuel mixture is done by a spark plug 21. The plug may be then switched off as further operation of the rotary internal combustion engine provides for fuel ignition at elevated temperatures of the working fluid in the overflow channels 23 and of the walls thereof. The most intensive combustion heat release in the overflow channels 23 occurs with the sides of the rotary pistons 5 and 6 closed (FIGS. 9 and 12). The combustion of the fuel can be terminated in expanding instant subchambers at the beginning of the combustion stroke (at high running speed of the engine when the fuel combustion time is the shortest). The combustion stroke further runs but in closed expanding instant subchambers (FIGS. 10 and 11).

When the increasing instant subchambers are let to communicate with the exhaust ports 19 there begins the exhaust stroke (FIGS. 10 and 11) and it runs on until the sides of the rotary pistons 5 and 6 are closed. When the sides of the rotary pistons 5 and 6 are closed, the instant subchambers are the smallest. This enables a practically complete exhaust of burnt gases from the working chamber of the casing 1. Such sequence of the strokes and specific phases of the gas exchange through the overflow channels 23 enables the rotary internal combustion engine with an external carburetion (called a hybrid internal combustion engine) to operate normally.

The overflow channels 23 in such a HICE are adjacent to the working chamber and connect the compressor section with and the expansion section thereof. In fact, the overflow channels 23 in the HICE perform the function of the combustion chambers of an internal combustion engine.

The service life and normal operation of the HICE are determined to a large extent by the functionality of compression seals (not shown) of the rotary pistons 5 and 6. Theoretically, the pistons 5 and 6 can operate so that the compression seals slide across the smooth surface of the working chamber of the casing 1 in under conditions of dry friction, as well as using a dry lubricant, such as graphite. To this effect, the dry lubricant may be incorporated into the material of compression seals or material of the working surface of the engine. However, to reduce the coefficient of friction of the compression seals, it is appropriate to apply lubricating oil to the surface of the working chamber of the casing 1 from a suitable lubricator and/or the crankcase of the internal combustion engine. To this end, oil supply unions 24 are mounted in the casing 1 (FIG. 13) and connected to the lubricator and/or crankcase of the HICE kinematic mechanism. In the crankcase, there is usually oil mist from the oil found there, which oil is sprayed as the internal combustion engine operates. This fog is needed to lubricate and cool the kinematic mechanism. Also, pressurized gases get into the crankcase from the working chamber. Therefore, it is desirable to feed oil and oil-containing gases into the working chamber of the casing 1 to lubricate it. Three radially distributed circlets (not designated in FIG. 13) indicate outlets of the oil supply unions 24 on the side of the working chamber of the casing 1. It is most appropriate to arrange the oil supply unions 24 along the perimeter of the edges of the pistons 5 and 6 between the overflow channel 23 and the intake port 18 and in close proximity to the latter. It is typical of this area of the working chamber of the casing 1 to have reduced pressure/underpressure and the lowest temperature. These conditions are optimal for feeding the working oil to the surface of the chamber, even by gravity. Limited/metered oil supply is possible by the oil supply unions 24 packed with a moisture permeable material 25, for example, sintered bronze pellets. Such lubrication results in a reduction of friction and temperature in the compression seals to enhance the service life and efficiency of the HICE.

Referring to FIG. 14, there is shown the simplest HICE having a casing 1 with a toroidal working chamber. Its operation is similar to the previously described rotary internal combustion engine with an annular working chamber (see FIGS. 1 and 9-12). The casing 1 having a toroidal working chamber permits the number of angular joints in compression seals to be reduced by using ring seals. This minimizes the leakage of compressed gas, simplifies the sealing of the rotary pistons 5 and 6 and improves the efficiency of the HICE.

In FIG. 15, the rotary internal combustion engine comprises the output shaft 7 having two offset portions 8 and a two-section casing 1 arranged between two planetary trains, such as described above with reference to FIGS. 2-8. The sections of the casing 1 as well the offset portions 8 on the common output shaft 7 can be set at an angle relative to each other so that the torques produced at both sections should be combined on the output shaft 7. The amount of the setting may amount to 180° and depends on the various applications of the engine and operating conditions. The angles of setting the sections of the casing 1 and the offset portions 8 are usually chosen such as to ensure phase shifting of the maximal and minimal amplitudes of the torques produced at each section to produce the most "smoothed" total torque. The overflow channels 23 in such a HICE are adjacent to the working chamber and connect the compressor section with and the expansion section thereof. In fact, the overflow channels 23 in the HICE perform the function of the combustion chambers of an internal combustion engine.

FIG. 16 represents a graph approximated with a sinusoid showing variations in torque M=f(φ), where φ is an angle of rotation of the output shaft 7 of the simplest rotary internal combustion engine (FIGS. 1, 9-12, 14) having a single-section casing 1. In this case, the torque has not only a high torque-variation amplitude, but a negative component as well. In order to overcome the negative component while the simplest RPICE runs especially at low-speed, the flywheel/balance beam 14 has to be heavy, though the engine gets heavier.

The rotary internal combustion engine with the two-section casing 1 (FIG. 15) produces a smooth resultant torque because the torques of both sections are combined on the common output shaft 7. In FIG. 17, curve "A" is a graph approximated with a sinusoid showing variations in the torque of the left-hand section, curve "B" is that of the right-hand section, and curve "C" is a graph showing the total torque on both sections. Consequently, the rotary internal combustion engine with the two-section casing 1 can show a new quality, i.e., the output torque that the output shaft 7 creates can be without a negative component and without great difference of its data. Such engine, in operation and under load, will be exposed to a lower level of peak loads and vibrations. This will have a beneficial effect on the efficiency, reliability, and service life of the engine. In this case the flywheel/balance beam 14 can be as light-weight as possible on conditions that it is sufficiently strong to thus reduce the weight of the rotary internal combustion engine.

FIG. 18 schematically illustrates the rotary internal combustion engine having a casing 1 defining a working chamber consisting of two sections of different volumes. The sections communicate through the overflow channels 23. In the smaller, or compression section, the working fluid is compressed, and in the substantially greater, or expansion section, the working fluid/gas is expanded as much as possible. This arrangement is useful to effectively utilize the energy of the fuel to thus improve profitability of the engine. In both a single-section engine and two-section engine, the overflow channel 23 actually serves as a combustion chamber, which is blocked with the end faces of the rotary pistons 5 and 6.

FIGS. 19 and 20 illustrate the operation of the compression section. In operation, the instant subchamber adjacent to one side of the rotary piston 5 expands and draws the working fluid from the intake port 18 (FIG. 19). The instant subchamber adjacent to the other side of the rotary piston 5 contracts and compresses the working fluid to push it into the overflow channel 23 through its input (also designated by reference numeral 23 in FIGS. 19 and 20). As this takes place, the flow channel 23 is blocked with the end faces of the pistons 5 and 6 to prevent excess pressure return into the compression section (FIG. 20). The rotary piston 6 operates in the same way as the rotary piston 5.

FIGS. 21 and 22 illustrate the operation of the expansion section. In operation, the instant subchamber adjacent to one side of the rotary piston 5 expands and the excess pressure of the working fluid does useful work from the overflow channel 23 (FIG. 21). Hot gases in the expansion section can expand to a maximum, i.e. until they are decompressed to atmospheric pressure. The instant subchamber adjacent to the other side of the rotary piston 5 contracts and compresses the working fluid to push it into the exhaust port 19. The rotary piston 6 operates in the same way as the rotary piston 5. As this takes place, the flow channel 23 is blocked with the end faces of the pistons 5 and 6 (FIG. 22), the outlet of the flow channel 23 is also blocked (the outlet also designated by reference numeral 23 in FIGS. 21 and 22). So the maximal expansion of the working fluid/gas provides for an improvement in the engine efficiency.

FIGS. 23 and 24 show the flow channel 23 for the single-section rotary internal combustion engine and two-section the rotary internal combustion engine respectively. This is the most thermally stressed site in the rotary internal combustion engine for it is here that high temperature combustion takes place. In order to relieve thermal stresses in the structural elements of the engine, the overflow channel 23 is outside of the working chamber of the casing 1 and mounted on the casing 1 via heat insulators 26. Due to the heat insulators 26, heat transfer from the walls of the overflow channel 23 to the casing 1 is minimized. Therefore, combustion in the overflow channels 23 approximates to adiabatic process due to a reduced temperature difference between the walls of the overflow channels and the working fluid/gases. In this way, heat losses due to operation of the engine cooling system are minimized. This provides for improved efficiency and reliability of the rotary internal combustion engine.

The overflow channel 23 is located between the compressor and the expansion sections of the working chamber of the casing 1. Therefore, there is no need to forcibly interrupt the fuel combustion as is the case in internal combustion engines and Wankel engine. In fact, here the overflow channel 23 functions as a combustion chamber similar to a gas-turbine engine. This is the "hybrid" feature of such rotary internal combustion engine.

It is typical of the known types of internal combustion engines to directly mix finely dispersed starting "raw" fuel with air prior to combustion, that is, fuel and a fuel-air mixture, usually do not receive any special treatment for more efficient subsequent combustion. Imperfection of fuel preparation for subsequent combustion is largely responsible for incomplete combustion (especially in the immediate vicinity of the "cold" walls of the working chamber and at high speed when the combustion time is strictly limited). FIG. 23 shows the overflow channel 23 of a single-section rotary internal combustion engine, the channel being lined with/filled with a highly porous gas-permeable heat-resistant ceramics 27, for example, silicon carbide. FIG. 24 shows the overflow channel 23 of a two-section rotary internal combustion engine, the channel being also lined with/filled with a highly porous gas-permeable heat-resistant ceramics 27. While the rotary internal combustion engine is running, the ceramics is heated by combustion of fuel and has a temperature of 1000° C. When the fuel mixture gets onto the ceramics a number of processes follow: evaporation of the fuel, thermal decomposition of the fuel into simpler hydrocarbons, mixing with air, etc. immediately before and during the combustion of the fuel [3, 4, 5]. This ensures complete combustion and improved profitability of the engine.

The mass and heat capacity of the porous ceramics 27 is much greater than the mass and heat capacity of the gases present in the overflow channel 23. This limits the peak combustion temperature.

As a result, there is an insignificant amount of harmful exhaust gases, e.g., NOx, thereby providing for environmental safety of the engine operation.

FIGS. 25 and 26 show the overflow channel 23 with an activator 28 for single-section and two-section HICE respectively. The activator 28 has a quantum energy influence on fuel before combustion and also during its combustion [6, 7] by exposure of a fuel-air mixture to an electric field, radio and/or microwave and/or quantum optical field. This promotes breaking up of the fuel into simpler hydrocarbons. The positive effect of such exposure consists in shorter and more effective combustion of the fuel-air mixture. In general, it helps to increase efficiency of the HICE.

FIGS. 27 and 28 show the overflow channel 23 for a single-section and two-section HICE respectively. The overflow channel 23 is provided with a fuel nozzle 29 and a nozzle 30 for directing additional working fluid. Efficiency of internal combustion engines is largely determined by fuel heat capacity. When the additional working fluid, such as water or steam, gets into the working chamber and flow channels 23, it increases the weight of the working fluid, the pressure and volume thereof as a result of expansion. Also, steam at a high temperature is capable of reacting with the hydrocarbons of the fuel to form a synthetic gas comprising hydrogen and carbon monoxide. This gas can be oxidized with the release of additional heat. All this taken together provides for improved efficiency of the HICE.

FIGS. 29 and 30 show the overflow channel 23 for a single-section and two-section HICE respectively. The overflow channel 23 is provided with a heat exchanger (s) 31 for the fuel nozzle 29 and the nozzle 30 for directing an additional working fluid. High-temperature heating of the fuel and additional working fluid by means of heat exchangers provides for an increase in the quantum-energy state of the reactants and better-quality preparation of the fuel for combustion. The interaction between the hot fuel and superheated live steam on the hot heat-resistant ceramic pores in the overflow channels provides an energy-rich fuel-air mixture. The mixture provides for efficient fuel combustion and efficient operation of the HICE.

The heat exchanger(s) 31 provide(s) for additional heating of the additional working fluid and/or fuel immediately before combustion. The high temperature provides a high energy potential and ultimate finely dispersed structure of the fuel and/or secondary working fluid prior to combustion by changing them into superheated steam. In fact, the heat exchanger(s) 31 are heat activators for the additional working fluid and/or fuel. As a result of the interaction of the hot fuel and superheated live steam on the heated pores of the heat-resistant ceramics 27 in the overflow channels 23 there is formed an energetic air-fuel mixture. Under a high temperature hydrocarbon fuel is broken up into the simplest components. In the presence of steam, there is formed a synthetic gas comprising hydrogen and carbon monoxide. Their oxidation provides additional heat and virtually eliminates the of unburned carbon in the engine exhaust. This ensures the completeness of combustion and increased efficiency of the HICE.

Operation of the rotary internal combustion engine with internal carburetion is maintained by means of the fuel nozzle 29 and the nozzle 30 for directing an additional working fluid, both disposed between the intake port and the overflow channel. which are arranged between the inlet channel 18 and flow channel 23. FIG. 31 shows the initial phase position of the rotary pistons 5 and 6 wherein the nozzles 29 and 30 direct fuel and additional working fluid to the working chamber of the engine. At high compression (similar to diesel) fuel supply can begin and end during the opening of the overflow channel 23 by means of the end face of the rotary pistons 5 or 6. As the air-fuel mixture flows from the working chamber into the overflow channel 23, it is intensely injected with high turbulence. This provides a good dispersion of the fuel-air mixture. In this case, it is necessary to eliminate the possibility of ignition of the fuel at the time of the compression stroke. The thermodynamic parameters of the working fluid at both sides of the window that has opened into the overflow channel 23 are selected such that the overflow rate was greater than the flame spreading speed [1, 2]. The initial ignition of the fuel in the overflow channel 23 is provided by a spark plug 21. Subsequent ignition of the fuel may be caused by hot gases, the walls of the overflow channel 23, and the hot porous ceramics 27 (FIGS. 23 and 24). The maximum heat release takes place in the channel 23 when the sides of the rotary pistons 5 and 6 are closed (FIGS. 9 and 12). In this case, the hole of the fuel nozzle 29 is securely blocked by the end face of one of the rotary pistons 5 or 6. In this position, fuel flow through the nozzle 29 should be stopped. So the possibility of gumming-up the nozzle 29 with hot gases is eliminated even when the "leakage of fuel" happens. In general, it provides for combustion efficiency and an increase in profitability of the HICE.

FIG. 32 illustrates a single-section HICE with the fuel injector 29 and nozzle 30 for directing an additional working fluid, both arranged before the intake port 18. This design provides for the maximal time and quality of carburetion at the entrance of the HICE. This results in an additional dispersion of the air-fuel mixture as it is intensively injected into the overflow channel 23 with high turbulence. This ensures completeness of combustion and increased efficiency of the HICE.

FIG. 33 illustrates a single-section HICE with the activator 28 located on the inlet pipe (not designated) between the motor intake port 18 and the nozzle 29 and/or nozzle 30. The activator 28 located at the engine entrance having a significant cross-section and volume allows an extended time of exposure of the fuel-air mixture to the activator. This allows the provision of a high quantum energy potential to the fuel-air mixture by exposure thereof to an electric field, radio and/or microwave and/or quantum optical field. This additional processing before burning the fuel-air mixture ensures completeness of combustion and increased efficiency of the HICE.

FIG. 34 shows the HICE with a turbocharger 32 and intercooler 33 positioned in the inlet pipe between the activator 28 and the fuel nozzle 29 and the nozzle 30 for directing an additional working fluid. When an additional working fluid and/or fuel is fed to the input of a high-speed turbocharger 32, the resultant fuel-air mixture gets a good initial thermo-mechanical treatment, including heating by compression. The intercooler 33 provides for cooling and greater density of the working fluid at the engine inlet. This is to ensure high specific power indicators of the HICE at constant internal friction losses. Then, the activator 28 performs additional quantum-energy fuel mixture preparation for combustion. All this taken together ensures completeness of combustion and improved efficiency of the HICE.

The rotary-piston internal combustion engines can be used in a variety of conditions, including road dust and sandstorms. Penetration of abrasive particles with a fuel mixture into the working chamber of the engine leads to malfunction of the compression seals, increased friction, poor efficiency of the engine, and even failure. Therefore it is necessary to eliminate dust from entering the engine. FIG. 35 shows the connection of the dust carrier 34 to the turbocharger 32. Structurally, the turbocharger 32 and the dust carrier 34 can be unitized and to have a common casing 35 (FIG. 36). High speed rotary blades 36 of the turbocharger 32 feed air/fuel mixture together with dust by centrifugal force into the circumferential annular channel 37. Under the influence of centrifugal forces the heavier dust enters the space occupied by the screw and/or helical spring 38, which is rotated by an external drive 39. As a result, dust is removed from the turbocharger 32 into the dust bin 40. The turbocharger 32 can effectively function as a centrifugal filter of dust particles if the dust is timely removed therefrom. It is the dust carrier 34 that provides timely removal. This ensures the operation of the compression seals with minimal friction to improve the efficiency of the HICE.

The input vanes 36 of the turbocharger 32 rotate at high speed. Therefore, they may get damaged when they contact with the dust particles, even with water droplets. Moreover, the wear fragments of the turbocharger vanes 36 can in themselves cause problems to the engine. A rubber-like abrasion resistant coating on the front edges of the turbocharger vanes 36 prevents damage of the vanes and ensures the normal operation of the compression seals with minimal friction losses. This improves efficiency of the HICE.

INDUSTRIAL APPLICABILITY

The proposed hybrid internal combustion engine does not have any features that require use of specific materials, coatings, tools, equipment, and special methods of their use, which are not known in general engineering. It is assumed that the invention can be implemented with the use of existing materials, equipment, and the currently known technology. Consequently, the proposed hybrid internal combustion engine can be manufactured commercially and used on an industrial scale.

REFERENCES

1. Ленин И. М. и др. Автомобильные и тракторные двигатели (Теория, системы питания, конструкции и расчёт), "Высшая школа", -М., 1960; стр. 90, 95 (Lenin, I. M. et al. Automobile and tractor engines (Theory, power systems, designs and computation). Vyshaya shkola Publishers; —Moscow, 1969; pages 90, 95. In Russian)
2. Архангельский В. М. и др. Автомобильные двигатели. "Машиностроение", -М., 1967; стр. 89, 96, 97 (Archangelsky V. M. et al. Automobile engines—Moscow, Mashinostroyenie Publishers, pages 89, 96, 97. In Russian)
3. Franz Durst[1] and Miroslaw Weclas[2]. A New Concept of I.C. Engine with Homogeneous Combustion in a Porous Medium. [1] Institute of Fluid Mechanics, University of Erlangen—Niirnberg, Cauerstrasse 4, D-91058 Erlangen, Germany; [2] Invent GmbH, Development of New Technologies, On Weichselgarten 21, D-91058 Erlangen, Germany.
4. Durst, F., Weclas, M., A new type of internal combustion engine based on the porous-medium combustion technique, J. Automobile Engineering. IMechE, Part D, Vol. 214 (2000).

5. Durst, F., Weclas, M., Method and device for converting heat into work, U.S. Pat. No. 6,125,815 (2000).
6. Дудышев В. Д. "⇋ управления горением пламени"//Патент РФ No. 2071219 от 19.04.94. (Dudyshev, V. D. "The method of controlling flame burning"//RU Patent No. 2,071,219 of 19.04.94. In Russian)
7. Дудышев В. Способ. "Способ интенсификации и управления горением пламени"// Патент РФ No. 2125682 (Dudyshev, V. D. "The method of intensifying and controlling flame burning"//RU Patent No. 2,125,682. In Russian)

The invention claimed is:

1. A hybrid internal combustion engine comprising:
a casing defining an annular working chamber and having an intake port, an exhaust port, and an overflow channel;
a planetary gear disposed within the casing and comprising:
two coaxial drive shafts disposed within the annular working chamber coaxially therewith and each provided with at least two rotary pistons on one end thereof and with an arm on the other end thereof, the rotary pistons in operation creating a compression section and an expansion section in the annular working chamber;
a stationary central gear wheel with external teeth and coaxial with the annular working chamber and the drive shafts;
an output shaft concentric with the drive shafts and having an offset portion carrying a carrier with a planetary gear wheel fixed thereon and having internal teeth in mesh with the external teeth of the stationary central gear wheel with a gear ratio
$i=(n+1)/n$ (where $n=2, 3, 4, 5 \ldots$, i.e., a series of integers), where n is the number of rotary pistons mounted on each of the drive shafts;
a connecting rod for each drive shaft pivotally connecting the carrier and the arm of the respective drive shaft;
wherein the overflow channel adjoins the annular working chamber and communicates therewith for connecting the compression section with the expansion section in the hybrid internal combustion engine operation.

* * * * *